(12) United States Patent
Rodrigue et al.

(10) Patent No.: US 8,462,357 B2
(45) Date of Patent: Jun. 11, 2013

(54) DEVICE AND METHOD FOR OBTAINING THREE-DIMENSIONAL OBJECT SURFACE DATA

(75) Inventors: Simon Rodrigue, Saint-Bruno-de-Montarville (CA); Francois Busque, Montreal (CA)

(73) Assignee: Technologies Numetrix Inc., Sherbrooke, QC (CA)

( * ) Notice: Subject to any disclaimer, the term of this patent is extended or adjusted under 35 U.S.C. 154(b) by 0 days.

(21) Appl. No.: 13/463,946

(22) Filed: May 4, 2012

(65) Prior Publication Data

US 2012/0229816 A1    Sep. 13, 2012

Related U.S. Application Data

(63) Continuation of application No. PCT/CA2010/001719, filed on Nov. 4, 2010.

(60) Provisional application No. 61/258,017, filed on Nov. 4, 2009.

(51) Int. Cl.
*G01B 11/24* (2006.01)

(52) U.S. Cl.
USPC .......................................... 356/610; 356/601

(58) Field of Classification Search
None
See application file for complete search history.

(56) References Cited

U.S. PATENT DOCUMENTS

| | | | |
|---|---|---|---|
| 4,349,277 A | 9/1982 | Mundy et al. | |
| 4,594,001 A * | 6/1986 | DiMatteo et al. | 356/608 |
| 4,641,972 A * | 2/1987 | Halioua et al. | 356/604 |
| 4,657,394 A * | 4/1987 | Halioua | 356/604 |
| 4,794,550 A | 12/1988 | Greivenkamp, Jr. | |
| 4,984,893 A | 1/1991 | Lange | |
| 5,003,187 A | 3/1991 | Zumbrunn et al. | |
| 5,262,844 A | 11/1993 | Millet et al. | |
| 5,289,264 A | 2/1994 | Steinbichler | |
| 5,471,308 A | 11/1995 | Zeien | |
| 5,581,352 A | 12/1996 | Zeien | |
| 5,636,025 A | 6/1997 | Bieman et al. | |

(Continued)

FOREIGN PATENT DOCUMENTS

| | | |
|---|---|---|
| WO | 0007030 A1 | 11/2000 |
| WO | 02059545 A1 | 8/2002 |
| WO | 2011054083 A1 | 5/2011 |

OTHER PUBLICATIONS

IPRP for PCT/CA2010/001719 mailed on Sep. 19, 2011 by the Canadian Intellectual Property Office.

*Primary Examiner* — Gordon Stock, Jr.
(74) *Attorney, Agent, or Firm* — Ipaxio S.E.N.C.

(57) ABSTRACT

The concept includes projecting at the object surface, along a first optical axis, two or more two-dimensional (2D) images containing together one or more distinct wavelength bands. The wavelength bands vary in intensity along a first image axis, forming a pattern, within at least one of the projected images. Each projected image generates a reflected image along a second optical axis. The 3D surface data is obtained by comparing the object data with calibration data, which calibration data was obtained by projecting the same images at a calibration reference surface, for instance a planar surface, for a plurality of known positions along the z-axis. Provided that the z-axis is not orthogonal to the second optical axis, the z-axis coordinate at each location on the object surface can be found if the light intensity combinations of all predefined light intensity patterns are linearly independent along the corresponding z-axis.

9 Claims, 27 Drawing Sheets

U.S. PATENT DOCUMENTS

| | | |
|---|---|---|
| 5,675,407 A | 10/1997 | Geng |
| 5,757,674 A * | 5/1998 | Marugame ............... 702/152 |
| 5,838,428 A | 11/1998 | Pipitone et al. |
| 6,028,672 A | 2/2000 | Geng |
| 6,094,198 A * | 7/2000 | Shashua ............... 345/419 |
| 6,229,913 B1 * | 5/2001 | Nayar et al. ............... 382/154 |
| 6,252,623 B1 | 6/2001 | Lu et al. |
| 6,341,016 B1 | 1/2002 | Malione |
| 6,438,272 B1 * | 8/2002 | Huang et al. ............... 382/286 |
| 6,509,973 B2 | 1/2003 | Kiyoi et al. |
| 6,549,288 B1 | 4/2003 | Migdal et al. |
| 6,556,706 B1 | 4/2003 | Geng |
| 6,559,954 B2 | 5/2003 | Takata et al. |
| 6,636,310 B1 | 10/2003 | Ben-Dov et al. |
| 6,690,474 B1 | 2/2004 | Shirley |
| 6,700,669 B1 | 3/2004 | Geng |
| 6,724,490 B2 * | 4/2004 | Ono ............... 356/614 |
| 6,750,975 B2 | 6/2004 | Takeda et al. |
| 6,763,133 B1 | 7/2004 | Park et al. |
| 6,765,606 B1 * | 7/2004 | Iddan et al. ............... 348/42 |
| 6,788,210 B1 | 9/2004 | Huang et al. |
| 6,813,035 B2 | 11/2004 | Hoffmann |
| 6,819,436 B2 * | 11/2004 | Ono ............... 356/614 |
| 6,853,458 B2 | 2/2005 | Yahashi et al. |
| 6,873,421 B2 | 3/2005 | Lim et al. |
| 6,906,809 B2 | 6/2005 | Fujiwara et al. |
| 6,937,348 B2 * | 8/2005 | Geng ............... 356/603 |
| 7,006,710 B2 | 2/2006 | Riley et al. |
| 7,009,718 B2 | 3/2006 | Fujita |
| 7,013,040 B2 | 3/2006 | Shiratani |
| 7,061,628 B2 | 6/2006 | Franke et al. |
| 7,092,563 B2 | 8/2006 | Shiratani |
| 7,119,350 B2 * | 10/2006 | Hashimoto et al. ...... 250/559.38 |
| 7,154,613 B2 | 12/2006 | Christ, Jr. et al. |
| 7,263,217 B2 | 8/2007 | Kawaike et al. |
| 7,274,470 B2 | 9/2007 | Lemelin et al. |
| 7,349,104 B2 | 3/2008 | Geng |
| 7,382,471 B2 | 6/2008 | Franke et al. |
| 7,388,678 B2 | 6/2008 | Forster et al. |
| 7,400,413 B2 | 7/2008 | Jeon et al. |
| 7,440,590 B1 | 10/2008 | Hassebrook et al. |
| 7,454,054 B2 * | 11/2008 | Fukumoto ............... 382/154 |
| 7,545,516 B2 | 6/2009 | Jia et al. |
| 7,576,845 B2 * | 8/2009 | Asakura et al. ............... 356/73 |
| 7,648,808 B2 | 1/2010 | Buchsbaum et al. |
| 2003/0002052 A1 | 1/2003 | Hoffmann |
| 2004/0145753 A1 | 7/2004 | Lim et al. |
| 2005/0244078 A1 | 11/2005 | Magarill et al. |
| 2009/0262367 A1 * | 10/2009 | Barbaresi ............... 356/612 |
| 2012/0229606 A1 * | 9/2012 | Rodrigue et al. ............... 348/46 |

* cited by examiner

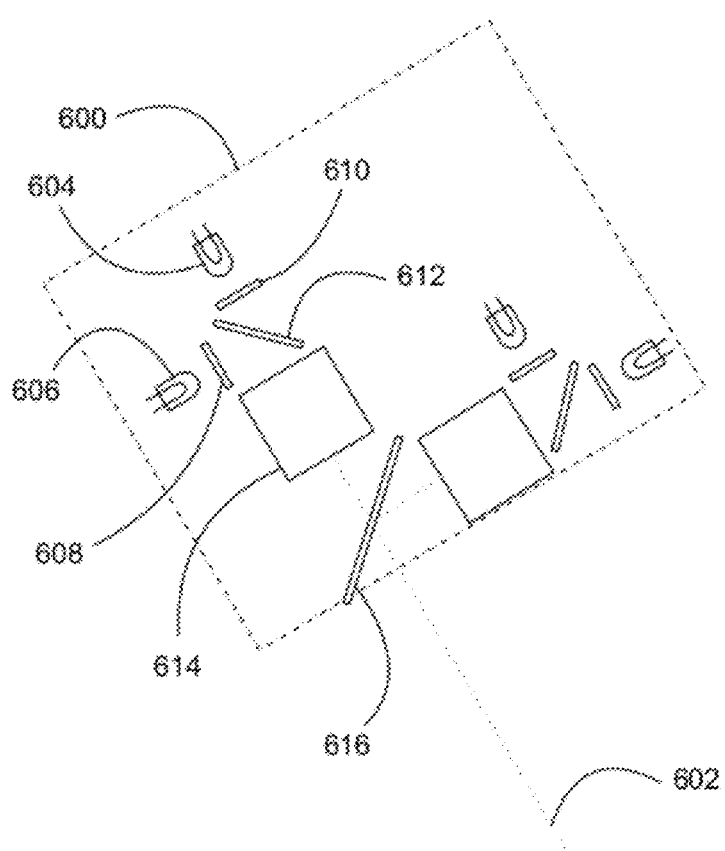
FIG. 25
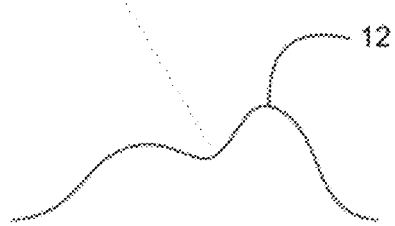

DEVICE AND METHOD FOR OBTAINING THREE-DIMENSIONAL OBJECT SURFACE DATA

CROSS-REFERENCE TO RELATED APPLICATIONS

This application is a continuation of PCT Patent Application No. PCT/CA2010/001719 filed on 4 Nov. 2010, which claims priority to U.S. Provisional Patent Application Ser. No. 61/258,017 filed on 4 Nov. 2009, the content of both of which is incorporated herein by reference.

TECHNICAL FIELD

The technical field relates to devices and methods for obtaining three-dimensional (3D) data about the surface of an object.

BACKGROUND

Different approaches have been proposed over the years for accomplishing 3D surface measurements. However, although many of these past approaches can be useful in some cases, none was found to be completely satisfactory for a number of reasons.

For instance, past approaches using phase-shifting techniques can offer good resolutions and yield results without requiring an extensive computation power. Phase shifting, however, generally involves moving the object surface being measured or moving a grating pattern during the data acquisition. Thus, the precision of the measurements often depends on the precision of the movements. Highly precise measurements generally entail using sophisticated moving mechanisms, thereby adding costs and complexity.

Past approaches using Moiré contouring techniques often experience limitations in the range of measurements because of the modulo $2\pi$ ambiguity. The measurement precision can decrease if the measurement range increases. Some strategies have been suggested to mitigate this phenomenon. However, these strategies are often based on the assumption that the object surface is devoid of abrupt discontinuities.

Past approaches using color coding with projections of color stripes or color dots are generally considered satisfactory but can have a limited precision since 3D measurements are often gathered from a relatively small number of color stripes or dots. Still, variations in the reflectivity of the object surface can have an impact on the measurements since reflectivity is often assumed to be uniform.

Another example of a past approach is the one using of fringe projections. These fringe projections can be generated using various devices, such as LCD (liquid crystal display), DLP (digital light processor) or other dynamic light modulation devices. These various devices dynamically produce different patterns and can be adapted to many different situations. However, their speed is limited by the response time of the dynamic light modulation device. By contrast, a projection through an optical filter is limited by the light source response time. The spatial and intensity resolutions of a dynamic light modulation device are often inferior to that of a projection through an optical filter.

Some other past approaches involve the projection of patterns having continuously varying wavelengths. This way, a direct relationship is created between the projection angle and the detected wavelengths reflected on the object surface. However, the precision of the measurements often depends on the precision of the detector sensing the reflected wavelengths. If some range of wavelengths cannot be detected, for example when using a RGB (red, green and blue) detector, the precision can decrease since some information will be lost.

U.S. Pat. No. 6,559,954, issued 6 May 2003 to Takata et al., discloses a method and a device in which multiple images containing a plurality of wavelength bands are projected, a pattern being located in each wavelength band of each image. This method and device necessitate dynamic spatial light modulators, such as found in a conventional color projector, which may not allow achieving short acquisition time, for instance of less than 1000 µs, to gather accurate 3D data from the surface of a moving object.

U.S. Pat. No. 6,937,348, issued 30 Aug. 2005 to Geng, discloses a method and a device in which a single image containing a plurality of wavelength bands is projected, the image containing a pattern located in each of the wavelength bands in order to obtain three-dimensional information. This method and device, however, may not always yield optimum results if the surface reflectivity in not at least approximately known in advance and if the surface reflectivity varies depending on the wavelength.

Accordingly, room for improvements still exists in this area.

SUMMARY

There is provided a new concept for obtaining 3D data about a surface of an object. The concept includes projecting at the object surface, along approximately a first optical axis, two or more two-dimensional (2D) images containing together one or more distinct wavelength bands. Each projected image includes a first image axis and a second image axis. The wavelength bands vary in intensity along the first image axis, forming a pattern, within at least one of the projected images. When projected on the object surface, each projected image generates a reflected image along approximately a second optical axis. The projected images are oriented so that the first image axis is not orthogonal to a plane defined by the first and the second optical axis. The reflected image is recorded by an image sensing unit. The 3D surface data is obtained by comparing the object data with calibration data, which calibration data was obtained by projecting the same images at a calibration reference surface, for instance a planar surface, for a plurality of known positions along the z-axis. Provided that the z-axis is not orthogonal to the second optical axis, the z-axis coordinate at each location of the object surface can be found if the light intensity pattern combinations of all predefined light intensity patterns projected along the first optical axis are linearly independent for each wavelength band along the corresponding z-axis.

Overall, the present concept allows using distinct wavelength bands for obtaining the 3D object surface data even if the reflectivity of the object surface can vary for each distinct wavelength band. Moreover, the method and device allow obtaining 3D data over an extended range without ambiguity. Furthermore, the method and device allow obtaining very accurate results. All required information can be acquired in less than 1000 µs for obtaining accurate 3D data of a surface of a moving object.

In one aspect, there is provided a device for obtaining 3D surface data of a surface of an object, the device including: a projection unit having at least one spatial light modulator, the projection unit being configured and disposed to project at least two different images coming from the at least one spatial light modulator at the surface of the object along approximately a first optical axis, each image being projected for less than 500 µs, at least one of the projected images including at least two spectrally multiplexed wavelength bands, each wavelength band being included in at least two of the projected images; an image sensing unit configured and disposed to record reflected images created by the corresponding projected images reflecting on the surface of the object along approximately a second optical axis; and a data processing unit to calculate the 3D surface data using at least some of the data from the recorded reflected images.

In another aspect, there is provided a method of obtaining 3D surface data, for instance expressed as {x,y,z} coordinates, about a surface of an object, the method including: projecting at the object surface, along approximately a first optical axis, at least two two-dimensional (2D) images containing together at least two wavelength bands, each projected image including a first image axis and a second image axis, each of the at least two wavelength bands varying in intensity along the first image axis within at least one of the projected images, each of the at least two wavelength bands being projected at least twice; upon projecting each image on the object surface, generating a reflected image along approximately a second optical axis, the projected images being oriented so that the first image axis is not orthogonal to a plane defined by the first and the second optical axis; recording the reflected images to obtain sets of object data, each set being indicative of light intensity levels corresponding to a wavelength band throughout the reflected images; and comparing the object data with pre-recorded calibration data so as to obtain the z-axis coordinates of a plurality of locations on the object surface, the calibration data being obtained by projecting the images at a calibration reference surface for a plurality of known positions along the z-axis, the step of comparing including, for each location on the object surface: assigning to the location a plurality of possible values of its z-axis coordinate; for each of the possible values of its z-axis coordinate, making a comparison between: sets of object data, the light intensity levels being read at a position in the reflected images where the location would be when assuming the possible value of the z-axis coordinate for that location; and corresponding data from the calibration data; and determining which one of the assigned values of the z-axis coordinates yields the best possible match between the sets of object data and the corresponding sets of calibration data, thereby finding the best z-axis coordinate for the location.

Further details on this aspect as well as other aspects of the proposed concept will be apparent from the following detailed description and the appended figures.

BRIEF DESCRIPTION OF THE FIGURES

FIGS. 22 to 27 are semi-schematic views illustrating other examples of projection units for the device shown in FIG. 1;

DETAILED DESCRIPTION

Figure 1:
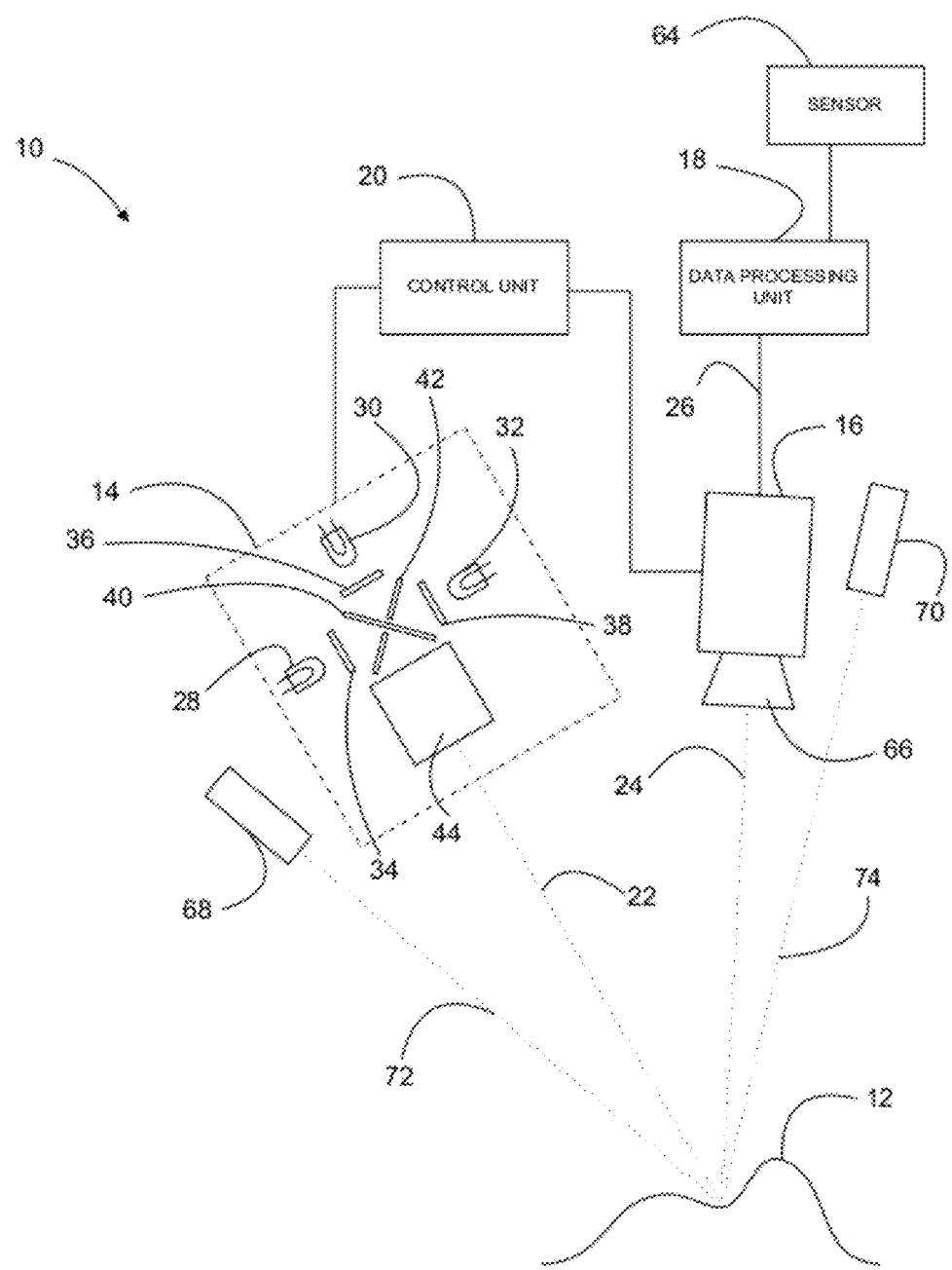
FIG. 1 is a semi-schematic view illustrating an example of a device to implement the proposed concept.

FIG. 1 is a semi-schematic view illustrating an example of a device 10 as improved herein. The device 10 is used for obtaining three-dimensional (3D) data about the surface of an object. The object surface is schematically depicted in FIG. 1 at 12.

It should be noted that the words "surface" and "object surface" generically refer either to a portion of the surface of the object or to the entire surface of the object. Thus, depending on the specific application, 3D surface data can be obtained for less than the entire surface of the object. In other cases, subsets of 3D surface data can be assembled together for obtaining the entire object surface.

The word "obtaining" and the like generically refer to the procedure of gathering and transforming data into computer-readable data representing the object surface. This computer-readable data, referred to hereafter as the 3D surface data, can be used for many purposes. For instance, the 3D surface data can be used for creating a virtual image of an object surface, for obtaining one or more dimensional values (length units for instance) of an object surface, for comparing an object surface to another one, etc.

As shown in FIG. 1, the illustrated device 10 includes a projection unit 14, an image sensing unit 16, a data processing unit 18, and a control unit 20.

The projection unit 14 sends images onto the object surface 12 along a first optical axis 22. These projected images are then reflected by the object surface 12. The image sensing unit 16 is positioned to receive the reflected images along a second optical axis 24. The image sensing unit 16 records the reflected light signals. The data from reflected images is recorded to form sets of "object data", each set being indicative of light intensity levels corresponding to a wavelength band throughout reflected images. The object data will be used for obtaining the 3D surface data. A plurality of reflected images is recorded for measuring the object surface 12, as explained further in the text. The exact way the object data is structured or recorded is not necessarily important, as long as all the required information can be obtained therefrom. The object data recorded at the image sensing unit 16 is transferred to the data processing unit 18. The data processing unit 18 can be a computer, for instance.

The data processing unit 18 can be located at various locations in an actual device. For instance, it can be located inside the image sensing unit 16, be located adjacent to the image sensing unit 16 or be located at a remote location. Also, the object data can be transmitted to the data processing unit 18 in real time or at given intervals. Alternatively, object data concerning more than one reflected image can be transmitted together at given intervals. Still, object data can be transmitted between the image sensing unit 16 and the data processing unit 18 using different arrangements, for example a wired connection (as shown in FIG. 1 at 26), a wireless connection or a portable physical memory media, for instance a portable disk. Other arrangements are also possible.

In the example illustrated in FIG. 1, the projection unit 14 includes three light sources 28, 30, 32 and three spatial light modulators 34, 36, 38. Each light source 28, 30, 32 generates light that covers all wavelength (spectral) bands of interest and that will be modulated by the corresponding spatial light modulators 34, 36, 38. These light sources 28, 30, 32 emit approximately the same spectral content. Each spatial light modulator 34, 36, 38 generates some form of spatially-varying modulation on a beam of light coming from a corresponding one of the light sources 28, 30, 32. Each modulator may modulate one or more spectral bands simultaneously. This variation of the light intensity levels forms what is referred to hereafter as a "light intensity pattern". Generally, all the chosen spatial light modulators 34, 36, 38 will modulate the same wavelength bands. As illustrated in FIG. 1, if each of the three spatial light modulators 34, 36, 38 modulates three wavelength bands, then a total of nine light intensity patterns (three light intensity pattern per wavelength band) will be projected. Examples of spatial light modulators include transparency slides, patterned optical filters, prism arrangements, slit sheets, LCD (Liquid crystal display) and DMD (digital micro mirror device). Other kinds of spatial light modulators are possible as well.

Some spatial light modulators, like a color transparency slide, can modulate light independently for multiple wavelength bands. For examples, a color-transparency slide can allow multiplexing three light intensity patterns into three distinct wavelength bands, such as wavelength bands corresponding to red, green and blue colors. Using other wavelength bands is also possible. The desired light intensity patterns can be created digitally on a computer and then transferred to a photographic film using a film recorder. A color transparency slide can then be produced, for instance with the E-6 process, from the photographic film.

The projection unit 14 illustrated in FIG. 1 further includes two crisscrossing beam splitters 40, 42 that are positioned behind a single lens 44. The beam splitters 40, 42 are provided for merging the light path of the three light sources 28, 30, 32 into a single path and the lens 44 is provided for focusing the projected images on the object surface 12. The light sources 28, 30, 32 can be activated sequentially, i.e. one after the other, in order to project three distinct images, each containing one or more wavelength bands over the object surface 12.

Figure 2:
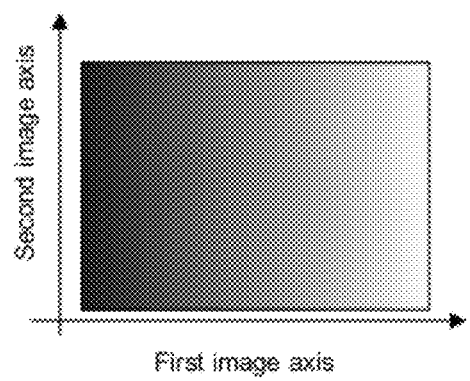
FIG. 2 is a view illustrating an example of a projected image created using the projection unit of the device shown in FIG. 1.

FIG. 2 is a view illustrating an example of a projected image created using the projection unit 14 shown in FIG. 1. The projected image being two dimensional, it includes a first and a second image axis, both axes being orthogonal. This projected image includes a single wavelength band varying in intensity along the first image axis. In the illustrated example, there is no light intensity level variation along the second image axis. The light intensity level, however, can vary slightly along the second image axis in an actual device, for instance due to optical distortion or other factors.

Figure 3:
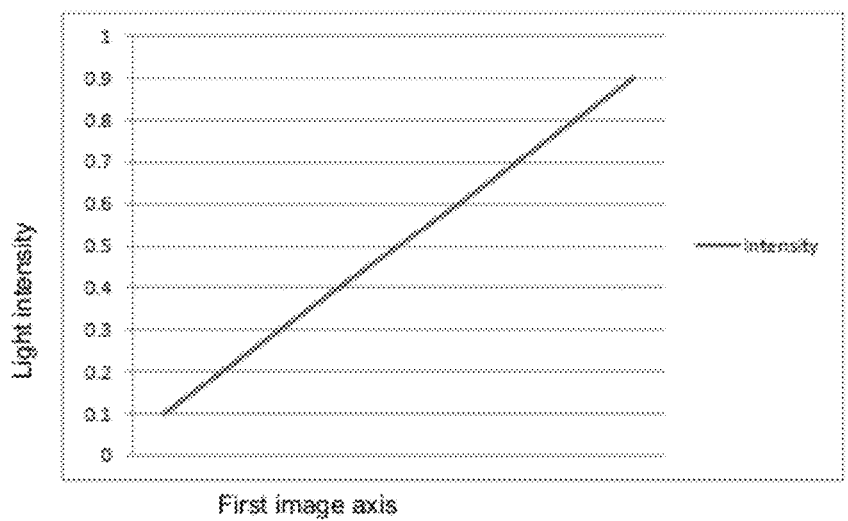
FIG. 3 is a graph illustrating an example of the light intensity pattern of the projected image shown in FIG. 2.

FIG. 3 is a graph illustrating an example of the light intensity level variation with reference to the first image axis of the projected image shown in FIG. 2. As can be seen, the light intensity level varies in the example between 0.1 and 0.9 of the maximum light intensity level. This restriction of the range of light intensity level is arbitrary. It prevents the light intensity level from falling outside the dynamic range of the image sensing unit 16 when the image will be reflected on the object surface 12. Using other values is also possible as well.

Figure 4:
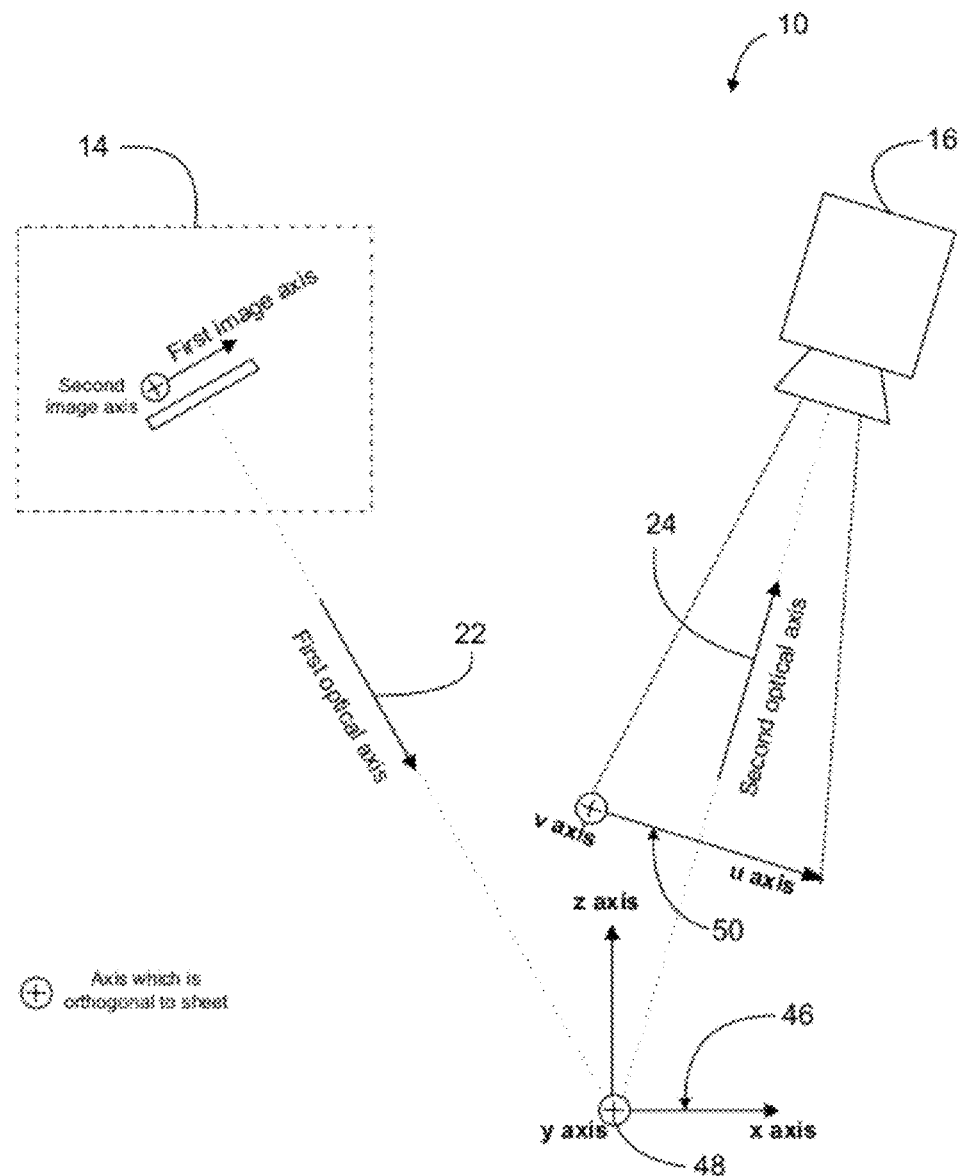
FIG. 4 is a schematic view illustrating the spatial coordinate systems used in the description of the device shown in FIG. 1.

FIG. 4 is a schematic view illustrating the spatial coordinate systems used in the description of the device 10 shown in FIG. 1. As can be seen, the first and the second optical axes 22, 24 are crossing approximately at the working distance of the projection unit 14 and the working distance of the image sensing unit 16. The projection unit 14 and the image sensing unit 16 are at about the same distance from the object surface in the illustrated example. However, they can also be at different distances from the object surface.

The first optical axis 22 defines a plane with the second optical axis 24 and the first image axis must not be orthogonal to that plane. Ideally, the first image axis is inscribed in the plane.

FIG. 4 further illustrates that the x,y,z axes define an orthogonal world coordinate system 46 in which the 3D surface data can be expressed. However, the z-axis must not be orthogonal to the second optical axis 24. In the illustrated example, the z-axis is inscribed in the plane formed by the first optical axis 22 and the second optical axis 24, but this is not an essential condition, as long as the z axis is not orthogonal to the second optical axis. Data expressed in the world coordinate system 46 using $\{x,y,z\}$ can be in length units, for instance in millimeters, with reference to a center point 48. In FIG. 4, this center point 48 is the location where the first optical axis 22 and the second optical axis 24 are crossing. Using another center point is also possible.

The images recorded by the image sensing unit 16 of the illustrated example have another coordinate system, called hereafter the "image coordinate system 50". The image coordinate system 50 is expressed in terms of $\{u,v,z\}$, which can be non-orthogonal and where the position $\{u,v\}$ corresponds to the projection of the pixels in space and z is defined when doing the calibration as seen later.

A mapping of the world coordinate system 46 and of the image coordinate system 50 can be accomplished through a calibrated camera model for calculating the parameters to transform data from one coordinate system to another. An example of a calibrated camera model could be based on the pin hole model of perspective projection. The coordinate system used hereafter in the present text will be the image coordinate system 50, assuming it is possible with a calibrated camera model to easily transform the image coordinate system 50 into the world coordinate system 46.

It should be noted that one can also use other kinds of coordinate systems, for instance a spherical coordinate system.

Each light source 28, 30, 32 in the projection unit 14 shown in FIG. 1 can include a plurality of illumination elements to increase the illumination power. For instance, the illumination elements can include a LED matrix with a corresponding focusing lens. Each light source 28, 30, 32 may also include illumination elements generating light in multiple wavelength bands. Furthermore, each light source 28, 30, 32 can be made controllable so as to change the intensity of each wavelength band in its output light, if desired. This feature can be useful if the reflection of the object surface 12 in a specific wavelength band is not optimum so that more or less illumination power is needed for that specific wavelength band. Each light source 28, 30, 32 may also include optical elements to improve light collection efficiency and a corresponding diffuser that scatters the incoming light to promote a uniform light distribution.

The light sources 28, 30, 32 and other components of the device 10 may sometimes be dependent upon environmental factors such as temperature, humidity, atmospheric pressure and others. In that case, the device 10 may include one or more environmental sensors, for instance a temperature sensor, providing a signal indicative of the corresponding environmental condition to be monitored. One sensor is schematically illustrated in FIG. 1 at 64. In the illustrated example, the sensor 64 is connected to the data processing unit 18. Other arrangements are also possible. This way, the relationship between the global response of the device 10 and the environmental conditions can be measured. Once the relationship is known, it is possible to apply correction factors on resulting measurements, depending on current environmental conditions. This feature can be useful for maintaining a high accuracy in all situations.

In the device 10 shown in FIG. 1, the depth of focus of the lens 44 of the projection unit 14 is designed to be higher than the desired measuring range. The lens 44 may be interchangeable so that lenses with different focal length can be used, depending on the size of the field of view or of the working distance. Alternatively, the lens 44 may have hand-operated or remotely-adjustable focusing and zooming to adjust the size of the projected image and the working distance without the need of changing the lens 44.

Figure 34:
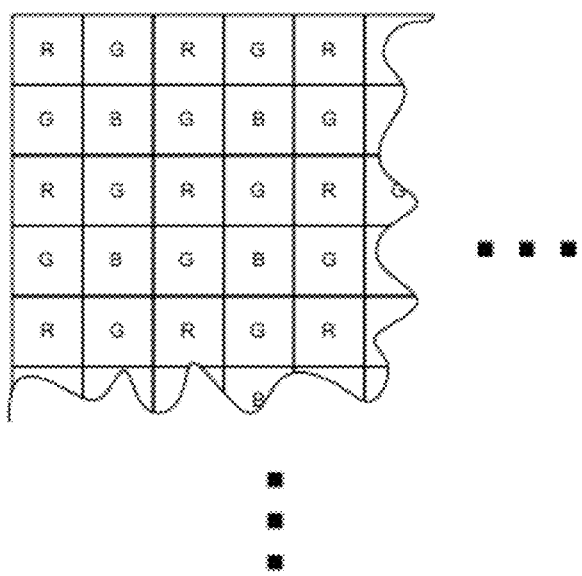
FIG. 34 is a semi-schematic view illustrating an example of a Bayer filter configuration.

The image sensing unit 16 of the device 10 shown in FIG. 1 includes at least one internal light sensitive sensor along with a corresponding lens 66 focusing at the object surface 12. Examples of a light sensitive sensor include a CMOS (complementary metal-oxide semiconductor) and a CCD (charge-coupled device) image sensor. Other kinds of sensors are possible as well. If spectrally-multiplexed wavelength bands are present in a projected image, the image sensing unit 16 can acquire reflected images for each wavelength band independently. In that case, multiple internal light sensitive sensors with spectral filters, for instance a 3CCD camera, can be provided. This way, different exposure time will be possible for each wavelength band. Another example of an internal light sensitive sensor is a camera with a Bayer filter. Such camera can be useful for acquiring many distinct wavelength bands. One example is shown in FIG. 34.

Still, other types of internal light sensitive sensors can be used, provided that their detectable wavelength bands substantially correspond to the projected wavelength bands.

The internal light sensitive sensor of the image sensing unit 16 should have linear responses for all wavelength bands. If not, it is possible to do a calibration and compensate the non-linearity with a mathematical function or a look-up table.

In the example of the device 10 shown in FIG. 1, the control unit 20 is provided to operate the light sources 28, 30, 32 of the projection unit 14 in a sequence. There is thus only one light source enabled at a time. The control unit 20 can also be used to trigger the image sensing unit 16 for acquiring an image each time a light source is activated. Each projected image will correspond to the projection of a corresponding one of the spatial light modulators 34, 36, 38.

The device 10 shown in FIG. 1 further includes two laser pointers 68, 70 angularly positioned with respect to each other and aimed at a common point inside the measuring range of the device 10. The first laser pointer 68 can be attached to the projection unit 14 and the second laser pointer 70 can be attached to the image sensing unit 16. These laser pointers 68, 70 can also be attached elsewhere on the device 10, if desired. The corresponding laser beams 72, 74 of the laser pointers 68, 70 facilitate the positioning of the device 10 at an approximate optimal distance from the object surface 12.

The device 10 covers one area of the object surface 12 at a time. In order to get an entire 3D shape of an object surface 12, measurements can be made all around the object surface 12 from multiple view points and be combined thereafter. It is possible to combine measurements if the position of the device 10 relative to the object surface 12 is approximately known at each measurement. For that purpose, a position tracking solution can be used. Examples include optical position tracking, magnetic position tracking, ultrasonic position tracking and inertial position tracking. Others also exist. Furthermore, it is also possible to use a motorized arrangement to move either the object surface 12 or the device 10 along a known trajectory. Once the relative position for each of the measurements is known, all measurements can be combined into a common 3D coordinate system so as to build a complete 3D model of the entire object.

In the proposed concept, there are three main procedures, namely a calibration data acquisition procedure, an object surface data acquisition procedure and a data processing procedure. This method can be implemented using a device such as the device 10 shown in FIG. 1. The method can also be implemented using a different device.

Figure 5:
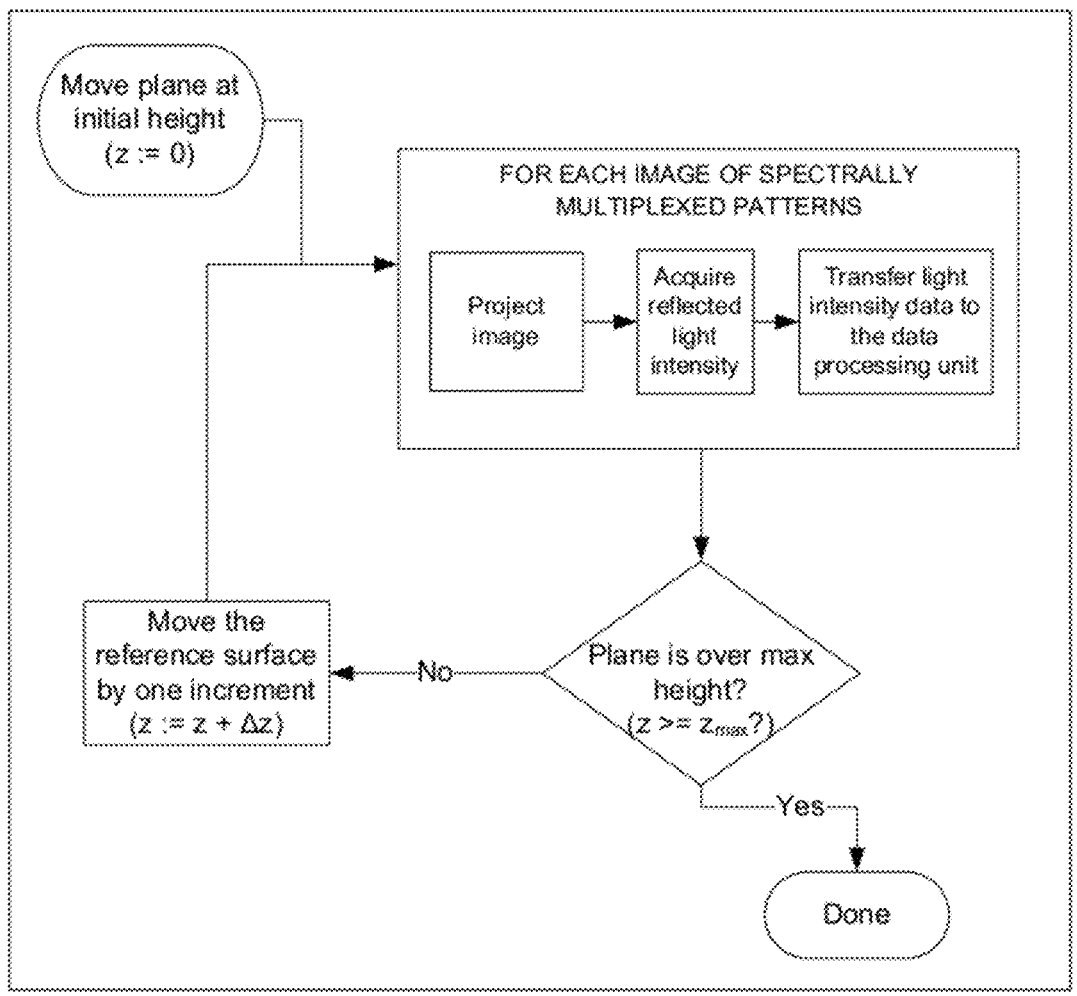
FIG. 5 is a data flow diagram illustrating an example of a calibration data acquisition procedure that can be used in the proposed concept.
Figure 6:
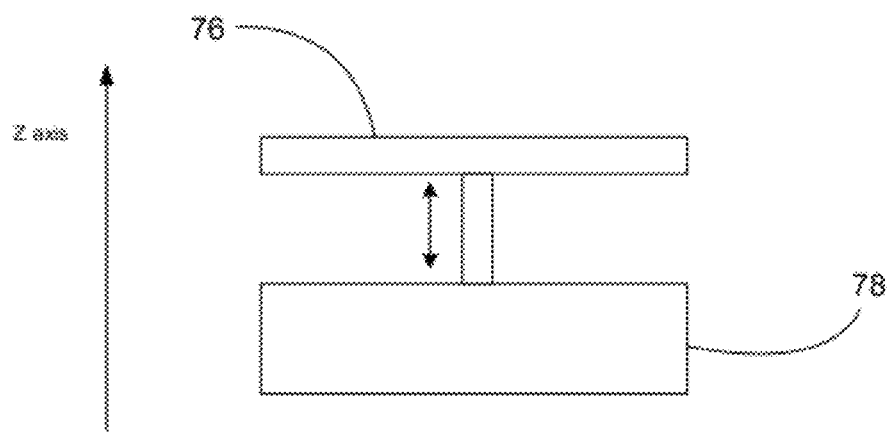
FIG. 6 is a schematic view illustrating an example of a calibration surface coupled to a mechanical linear actuator for use with the device shown in FIG. 1.

FIG. 5 is a data flow diagram illustrating an example of the calibration data acquisition procedure that can be used in the proposed concept. The calibration of the device 10 is performed using a calibration reference surface, for instance a planar surface, set in the field of view. An example of a calibration surface 76 completed to a mechanical linear actuator 78 for use with the device 10 is schematically illustrated in FIG. 6. This calibration surface 76 is orthogonally positioned with respect to the z axis and is connected to the mechanical linear actuator 78 to move the calibration surface 76 along the z axis relative to the projection unit 14 and the image sensing unit 16. At that point, the relative distance and angle between the projection unit 14 and the image sensing unit 16 are fixed. The calibration can start by positioning the calibration surface 76 at an initial position corresponding to z=0.

During the calibration data acquisition, different images are projected on the calibration surface 76 by the projection unit 14 and the corresponding reflected images are recorded by the image sensing unit 16. The first projected image can be for instance the one shown in FIG. 2. As aforesaid, FIG. 3 illustrates the light intensity pattern of the image in FIG. 2 with reference to the first image axis. As indicated in FIG. 5, the projected images can also include a plurality of spectrally multiplexed light intensity patterns. More explanations on this will be given later in the text.

Figure 7:
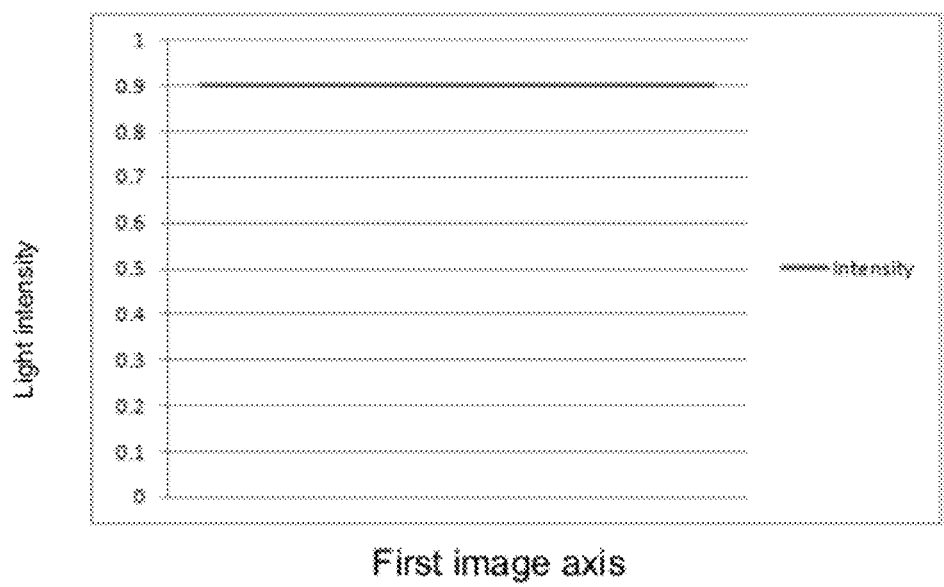
FIG. 7 is a view illustrating an example of the light intensity pattern of a second projected image created using the projection unit of the device shown in FIG. 1.

The second projected image has a different light intensity pattern but has the same wavelength band as the one in the first projected image. The second projected image can even have a uniform light intensity pattern along both the first and the second image axis. FIG. 7 is a view illustrating an example of the light intensity pattern created using the projection unit of the device shown in FIG. 1.

During calibration, each image is projected by the projection unit 14 on the calibration reference surface 76 along the first optical axis 22. The data concerning the recorded reflected images, which data include for instance information on the light intensity levels read at each photosite, is eventually transferred to the data processing unit 18 where it is stored, for instance in a non-volatile memory. From the initial position, the calibration reference surface 76 is then moved by one increment corresponding to Δz along the z-axis and the same set of images are projected and recorded once again. This is repeated several times until the maximum height $z_{max}$ is reached. The height $z_{max}$ is at least equal to the depth range. The calibration reference surface 76 will reach $z_{max}$ after n displacement by the increment Δz in the z axis. Δz can vary, but in that case, for each acquired image, the corresponding z must be known.

Figure 8:
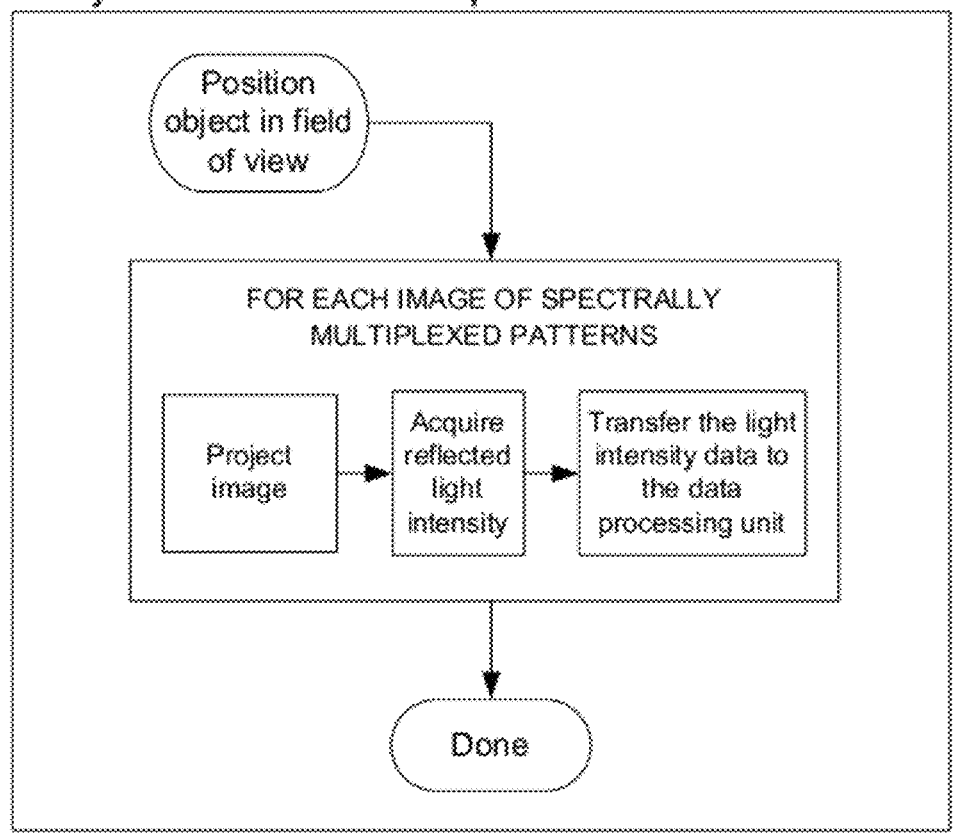
FIG. 8 is a data flow diagram illustrating an example of an object surface data acquisition procedure that can be used in the proposed concept.

FIG. 8 is a data flow diagram illustrating an example of the object surface data acquisition procedure that can be used in the present concept. It starts in the example by positioning the object surface 12 in the field of view, for instance the field of view of the device 10. Then, two images are projected over the object surface 12 by the projection unit 14. The reflected images are acquired by the image sensing unit 16 and the light intensity level data are eventually transferred to the data processing unit 18.

Figure 9:
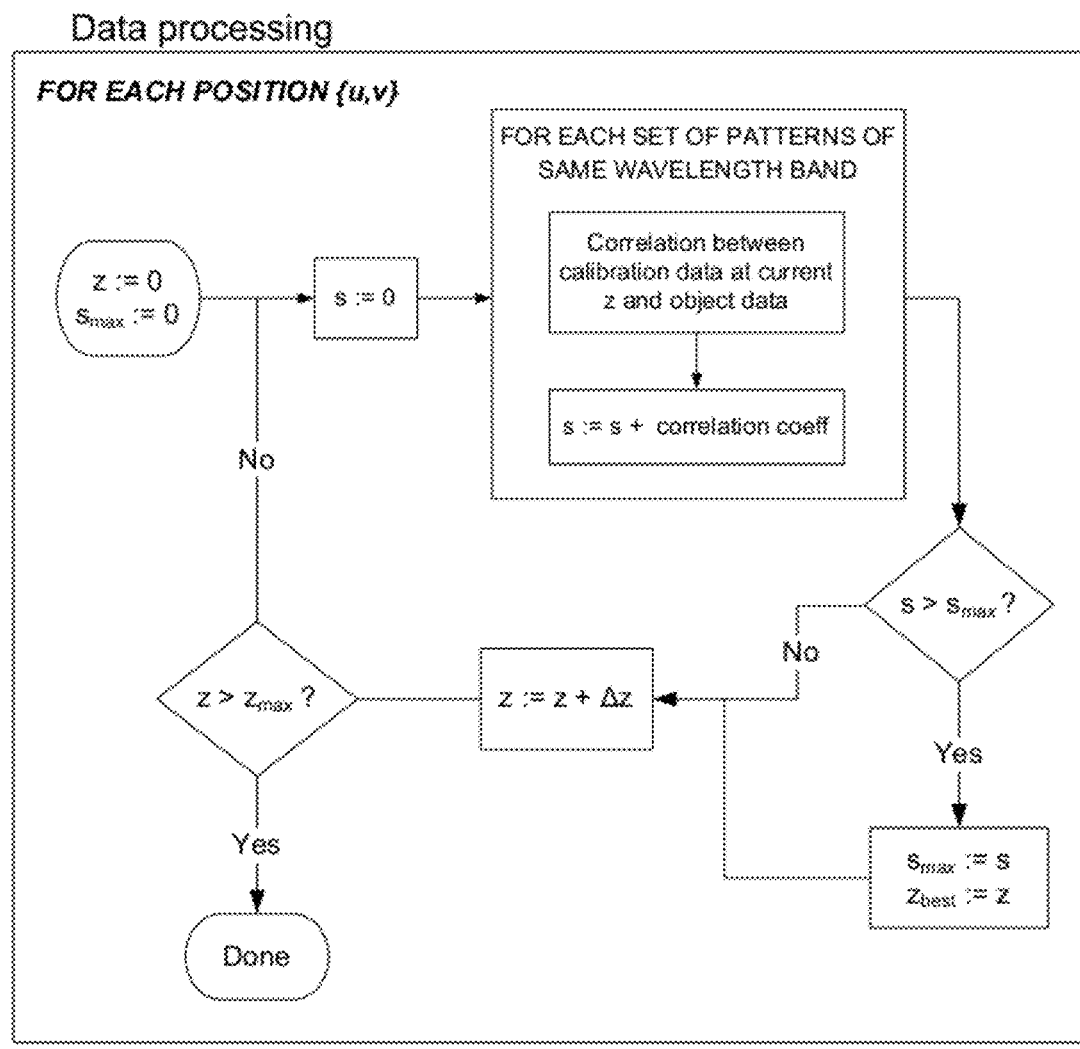
FIG. 9 is a data flow diagram illustrating an example a data processing procedure that can be used in the proposed concept.

FIG. 9 is a data flow diagram illustrating an example of the data processing procedure that can be used in the present concept. This data processing can be performed in the data processing unit 18 or elsewhere, if desired. Initially, the z variable, representing the position along the z-axis, is set to 0 and the $s_{max}$ variable is set to 0. The variable "s" represents a sum of correlation coefficients. This variable will be used for comparing the object data with the pre-recorded calibration data.

For each wavelength band, at each position {u,v} for instance, a linear correlation is done between the calibration data corresponding to the current z position and the data in the recorded object data. The resulting correlation coefficients for each wavelength band are added into the same variable s. If the value of s is larger than $s_{max}$ at a given position {u,v}, then the value of z is assigned to $z_{best}$ and the value of s is assigned to $s_{max}$. Thereafter, Δz is added to z. If z is not above $z_{max}$, then for each wavelength band, at each position {u,v}, a linear correlation is calculated between calibration data corresponding to the current z position and the data in the recorded object data. The resulting correlation coefficients for each wavelength band are added into the same variable s. If the value of s is larger than $s_{max}$ at a given position {u,v}, then the value of z is assigned to $z_{best}$ and the value of s is assigned to $s_{max}$. After that, Δz is added to z. If z is not above $z_{max}$, then the data processing continues. After n iteration, z will reach $z_{max}$ and the calculation will be completed after a last calculation. For each position {u,v}, the value of the variable $z_{best}$ will correspond to the height at one point on the object surface, thereby forming the 3D object surface data.

The following paragraphs will give more details on the rationale and the mathematics behind the concept. For the sake of clarity, the explanations use two projected images, each projected image including the same wavelength band.

The variables include:

I(u,v,z) Light intensity level of the projected image at a particular position in the three-dimensional measuring range ρ(u,v) Reflectivity factor at a particular position on the object surface $ρ_C$ Reflectivity factor of the calibration reference surface O(u,v) Light intensity level at a particular position in the reflected image recorded by the image sensing unit for the object surface s Correlation coefficient obtained from a linear regression C(u,v,z) Light intensity level at a particular position in the reflected image recorded by the image sensing unit for the calibration reference surface when the calibration reference surface was at the z position along the z-axis.

The subscript 1 or 2 is indicative of whether a variable relates to the first or the second projected image.

When an image is projected on the object surface 12 by the projection unit 14, the light intensity level anywhere in space in the measuring range can be expressed by I(u,v,z). At each location on the object surface 12, there is a reflectivity factor that can be expressed by ρ(u,v). For the sake of simplicity, the variations of the reflectivity factor in function of the wavelength bands are not taken into account for now. The light intensity levels in the images reflected by the object surface 12 will be sensed by the image sensing unit 16 and recorded. The light intensity level at each position can be expressed by O(u,v). Thus, $$O(u,v)=ρ(u,v)*I(u,v,z) \rightarrow \qquad \text{Equation 1}$$

During the calibration, light intensity levels were acquired using the calibration reference surface 76 for a plurality of known positions along the z-axis. The reflected light intensity level read at each position and at each value of the z-axis can be expressed by the following equation:

$$C(u,v,z)=ρ_C*I(u,v,z) \rightarrow \qquad \text{Equation 2}$$

C depends on z because it represents the projected light intensity level that may vary along the z-axis for a particular position {u,v}. On the other hand, O does not depend on z because it represents the light intensity level reflected from a specific location on the object surface 12 where the z-axis value is fixed.

Because the reflectivity of the calibration reference surface is considered approximately perfect and constant for all positions {u,v}, it is assumed that $ρ_C \cong 1$. In that case:

$$C(u,v,z)=I(u,v,z) \rightarrow \qquad \text{Equation 3}$$

If I(u, v, z) of equation 1 is replaced by equation 3, then:

$$O(u,v)=ρ(u,v)*C\,u,v,z) \rightarrow \qquad \text{Equation 4}$$

In order to perform a correlation between two random variables, corresponding here to O(u, v) and C (u, v, z), a set of at least two individual data must be obtained. This can be accomplished by projecting two distinct light intensity patterns, for example the ones whose profiles are shown in FIGS. 3 and 7. This will give the following system of equations:

$$O_1(u,v)=ρ(u,v)*C_1(u,v,z)$$

$$O_2(u,v)=ρ(u,v)*C_2(u,v,z)$$

At each location corresponding to a position {u,v}, for a plurality of assigned values of the z-axis coordinates, the correlation is done between sets of object data and the corresponding sets of calibration data. Each set corresponds to light intensity levels for a wavelength band throughout the reflected images, the light intensity levels being read at a position in the reflected images where the location would be when assuming the possible value of the z-axis coordinate for that location. If the light intensity pattern combination $C_1(u, v, z)$ and $C_2(u, v, z)$ are linearly independent along the z-axis, then the correlation between the first set formed by $C_1(u, v, z)$ and $C_2(u, v, z)$ and the second set formed by $O_1(u, v)$ and $O_2(u, v)$ is going to be at a maximum when z corresponds to the object surface height. The light intensity patterns of the profiles shown in FIGS. 3 and 7 will allow resolving the height (i.e. the z-axis coordinate value) because the light intensity pattern combinations along the first image axis are linearly independent.

Figure 10:
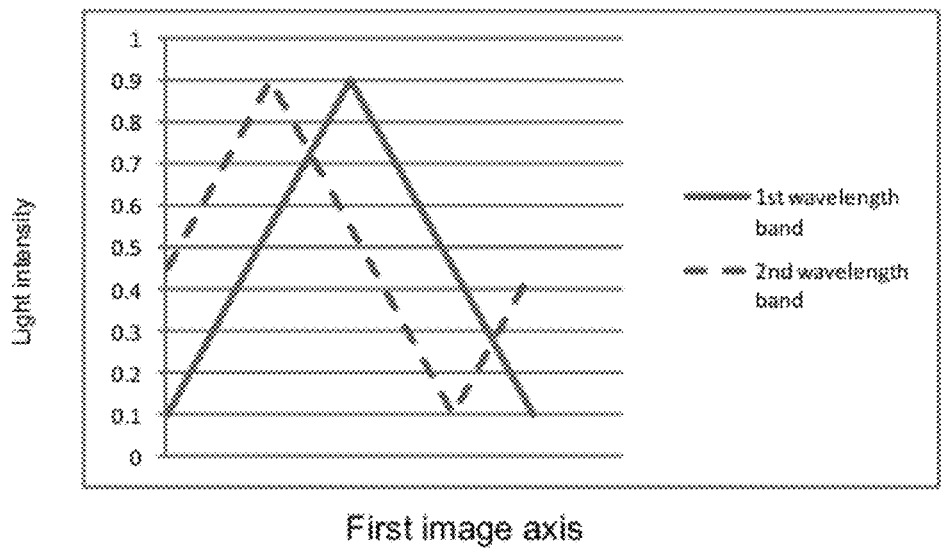
FIGS. 10 and 11 are graphs illustrating examples of multiplexed light intensity patterns created using the projection unit of the device shown in FIG. 1.

In order to improve immunity to noise, faster varying light intensity patterns can be projected by the projection unit 14 for the second set of projected images. An example is shown in FIG. 10. FIG. 10 is a graph illustrating an example of a multiplexed light intensity pattern created using the projection unit 14 of the device 10 shown in FIG. 1. Since the light intensity patterns in the example shown in FIG. 10 are varying twice as fast as the single light intensity pattern shown in the example of FIG. 3, it means that the light intensity pattern combination shown in FIG. 10 will have a better immunity to noise than the single light intensity pattern of FIG. 3.

Figure 11:
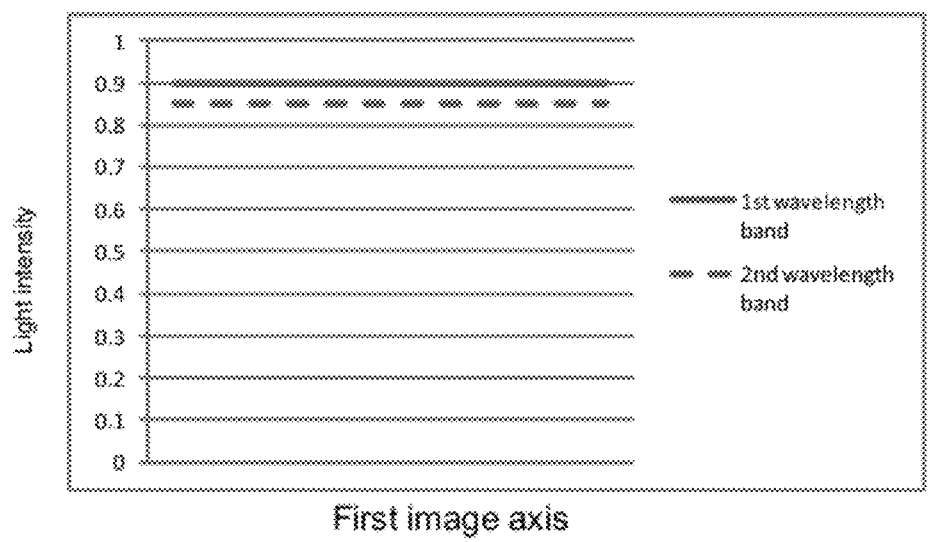

FIG. 11 illustrates another example of light intensity patterns in a projected image having two distinct wavelength bands that could be used in conjunction with the light intensity patterns in FIG. 10. In that case, the light intensity pattern for each wavelength band is simply constant. Constant patterns are very useful because they are very linearly independent of all types of varying patterns and will allow resolving height without ambiguity. The light intensity pattern combination of FIG. 10 with FIG. 11 has the property of being linearly independent at each point along the first image axis. Other type of light intensity patterns can also be use with the light intensity patterns of FIG. 10 as long as they allow preserving linear independency along the first image axis.

The subscript A or B is indicative of whether a variable relates to the first or second wavelength band used in the example.

The system of equations resulting from the projection of two sets of two spectrally multiplexed light intensity patterns is as follows:

$O_{1A}(u,v) = \rho_A(u,v) * C_{1A}(u,v,z) \rightarrow$ First wavelength band of first set $O_{2A}(u,v) = \rho_A(u,v) * C_{2A}(u,v,z) \rightarrow$ First wavelength band of second set $O_{1B}(u,v) = \rho_B(u,v) * C_{1B}(u,v,z) \rightarrow$ Second wavelength band of first set $O_{2B}(u,v) = \rho_B(u,v) * C_{2B}(u,v,z) \rightarrow$ Second wavelength band of second set The wavelength bands are now taken into account in the explanation. Since the reflexivity factor of the object surface $\rho(u, v)$ depends on the wavelength band, there is a unique reflectivity factor for each wavelength band corresponding to $\rho_A(u, v)$ and $\rho_B(u, v)$, as shown in the previous system of equations. Correlation must be performed independently over each wavelength band resulting in two correlation coefficient $s_A$ and $s_B$. In other words, a correlation can be computed between $\{O_{1A}, O_{2A}\}$ and $\{C_{1A}(z), C_{2A}(z)\}$ to give $s_A$ and then between $\{O_{1B}, O_{2B}\}$ and $\{C_{1B}(z), C_{2B}(z)\}$ to give $s_B$. This process is repeated at a plurality of z-axis values over the z range in order to find the best solution, or in other words, the solution with the strongest linear relationship between the O and C data. Having the best solution is assumed when the sum of the correlation coefficient ($s = s_A + s_B$) is maximized. In that case, the z position corresponding to the best solution will be the position of the object surface along the z-axis corresponding to the point $\{u,v\}$.

Thus, briefly stated, the method consists in maximizing the correlation coefficient s at each point $\{u,v\}$ in order to find the corresponding height z. Some optimization techniques could be applied in order to speed up the process of maximizing the correlation coefficient without going through all possibilities along the z-axis.

The correlation coefficient used in the method can correspond to the Pearson correlation coefficient that will be maximized. It can also be a sum of squared residuals obtained from a linear regression that will be minimized. It could also be any other means for qualifying the strength of the linear relationship between two sets of data.

In order to have a unique solution, the combination of $C_{1A}(Z), C_{2A}(Z), C_{1B}(Z), C_{2B}(z)$, for each position $\{u,v\}$, must be linearly independent for all z positions over the relevant range in z. At the same time, in order to have the best possible immunity to noise, the combination of $C_{1A}(Z), C_{2A}(Z), C_{1B}(Z), C_{2B}(z)$ should vary as fast as possible.

Figure 12:
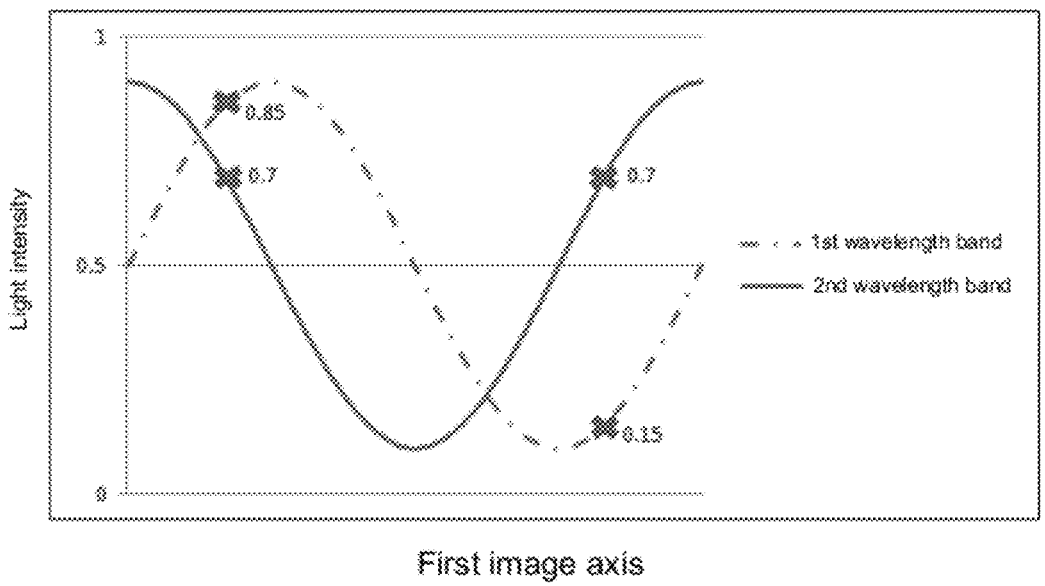
FIGS. 12 and 13 are graphs illustrating two examples of multiplexed light intensity patterns containing a linear dependency, thus that should not be used.
Figure 13:
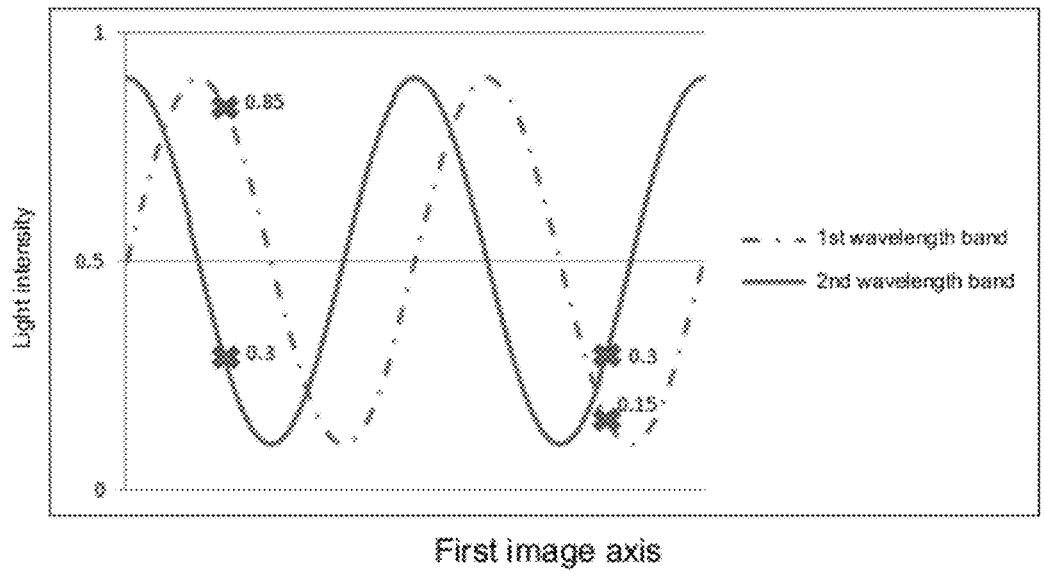

In order to be able to resolve z without ambiguity, there must be a linear independency for all light intensity pattern combinations, when considering all wavelength bands, along the z axis. If there is an intensity combination at a certain z position, for which applying a scaling factor for each wavelength band allow falling on the value of another intensity combination at another z position, then it means that there is linear dependency along the z axis. FIGS. 12 and 13 are graphs illustrating two unsuitable examples of two multiplexed light intensity patterns since they contain a linear dependency. In that case, at 60 degrees (relative to the signal period in FIG. 12), there are the values 0.85 in FIG. 12 and 0.85 in FIG. 13 for the first wavelength band, and there are the values 0.7 in FIG. 12 and 0.3 in FIG. 13 for the second wavelength band. By applying a scaling factor of 0.1764 on the first wavelength band and a scaling factor of 1 for the second wavelength bands for values found at 60 degrees, the values for the corresponding light intensity patterns of each wavelength band at 300 degrees are the same. This means that the light intensity pattern combination of FIGS. 12 and 13 contain a linear dependency and thus will not allow resolving height without ambiguity. They are not suitable for use in the device 10 or the method.

Figure 14:
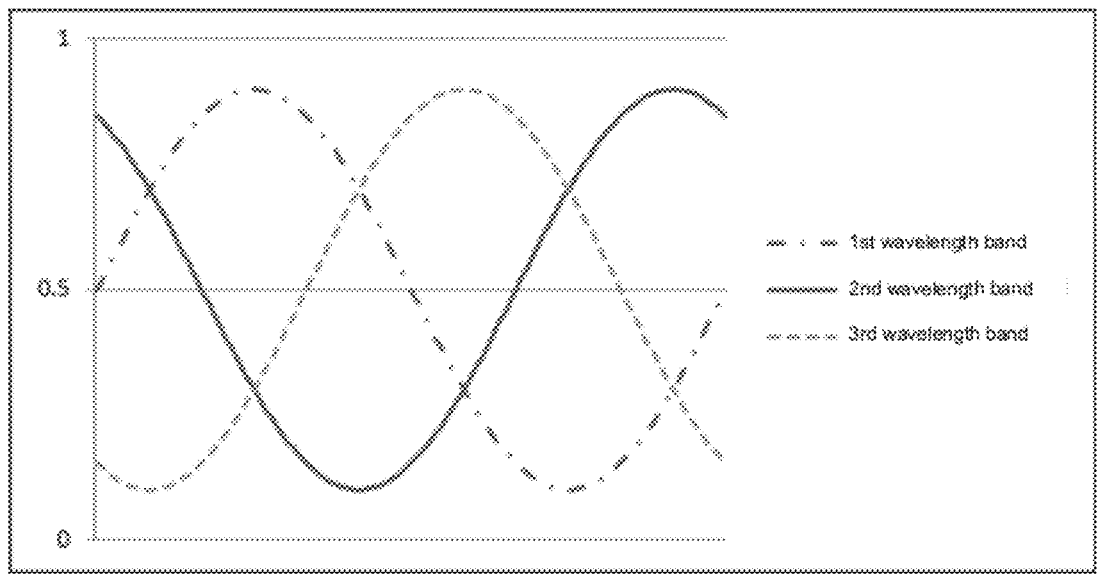
FIGS. 14 to 18 are graphs illustrating examples of multiplexed light intensity patterns created using the projection unit of the device shown in FIG. 1.
Figure 15:
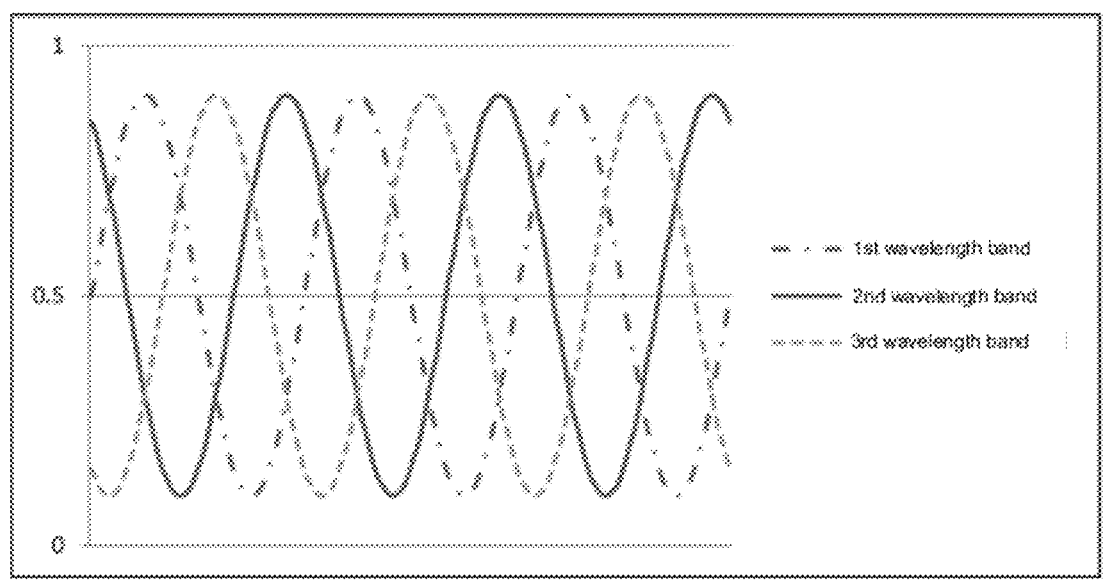
Figure 16:
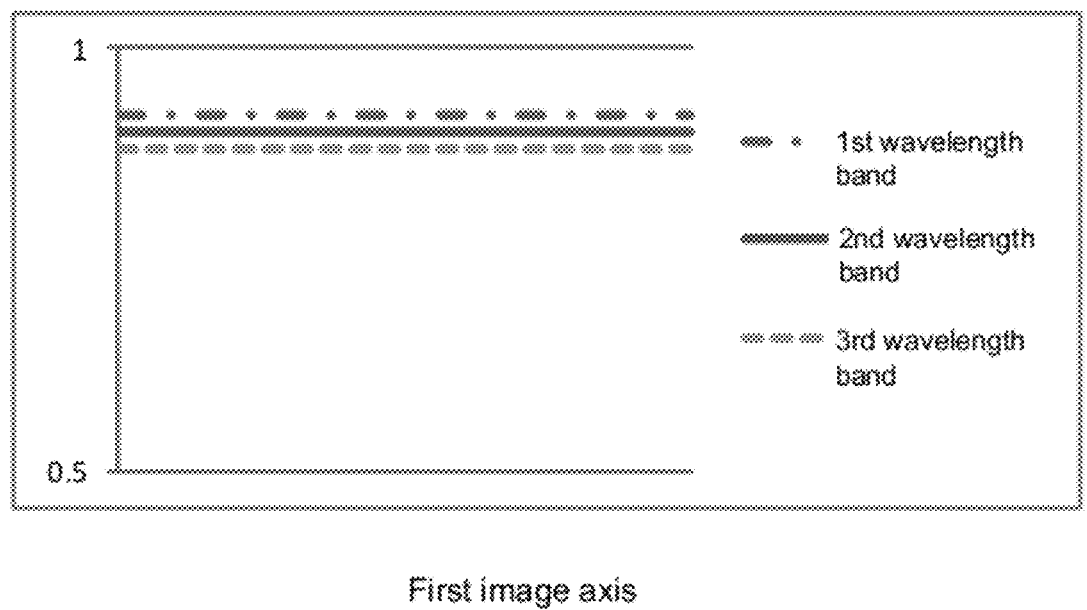

Suitable combinations of light intensity patterns are shown in FIGS. 14 to 18. FIGS. 14 to 18 are graphs illustrating examples of multiplexed light intensity patterns created using the projection unit 14 of the device 10 shown in FIG. 1. Each projected image is spectrally multiplexed and includes three or four distinct wavelength bands. The profiles of the light intensity patterns of the examples shown in FIGS. 14 and 15 are sinusoids with specific phase shift of 0, 120 and 240 degrees, respectively, corresponding to each wavelength band. The light intensity patterns whose profiles are shown in FIG. 15 are varying more quickly along the first image axis in order to increase the immunity to noise. The additional constant light intensity patterns shown in FIG. 16 have proven to increase results quality since they are very linearly independent to all other varying light intensity patterns and allow resolving correlation coefficients with a greater accuracy. The period of the sinusoids in FIG. 15 is one third of the length of the period in FIG. 16. The combination of patterns of FIGS. 14 to 16 is linearly independent all along the first image axis. The use of three sets of three spectrally multiplexed light intensity patterns as shown in FIGS. 14 to 16 provides a very good overall signal to noise ratio, thus resulting in even more accurate measurements. The period length of the profiles of the light intensity patterns shown in FIGS. 14 and 15 can be adjusted in order to yield the best possible results. The signal dynamic range, the noise and imperfections present in the device 10 can influence which period length is the best.

Figure 17:
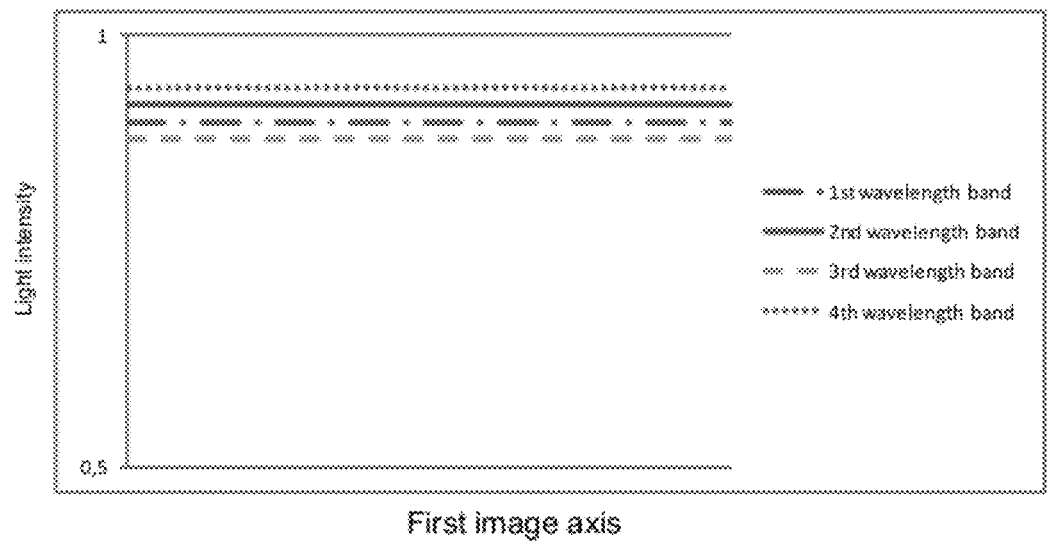
Figure 18:
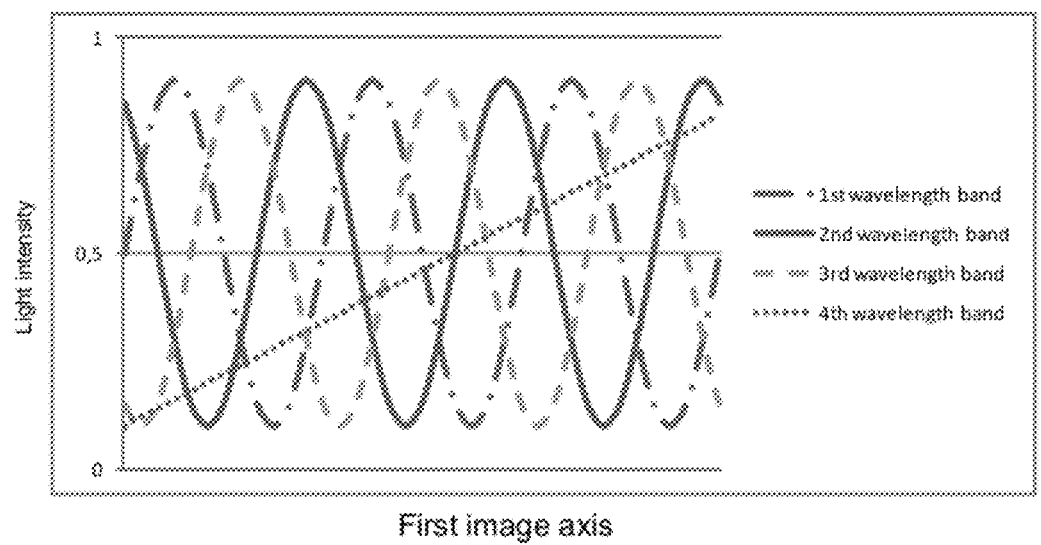

The light intensity pattern combinations illustrated in FIGS. 17 and 18 have proven to perform well in situation where only two spectrally multiplexed images are to be projected resulting in a smaller total acquisition time. This combination is made of four wavelength band, each wavelength band having two patterns. In three of the wavelength bands, there is a sinusoidal pattern, with specific phase shift of 0, 120 and 240 degrees, respectively, corresponding to each of these three wavelength bands. In the other wavelength band there is a ramp signal. Each wavelength band also contains a constant light intensity pattern. The sinusoidal pattern bring better accuracy because they are varying rapidly while the ramp signal make sure there is no ambiguity over the depth of measurement.

The chosen light intensity pattern combinations can be repeated along the first image axis while increasing pattern frequencies. This can increase immunity to noise and thus can result in a greater accuracy in height. If the z measuring range is small enough so as to span only a portion of the projected image along the z axis at each position $\{u,v\}$, and that portion is corresponding to less than one repetition of the light intensity patterns, then there will be no height resolution ambiguity. In the case of a ramp pattern as shown in FIG. 18, the repetition may introduce an intensity discontinuity along the z axis for some position $\{u,v\}$. This discontinuity in the pattern will introduce ambiguities in the results. The solution in that case is to detect whether or not there is a discontinuity surrounding the position $\{u,v\}$, and if it is the case, perform an algorithm around that position to resolve the ambiguity.

The device depicted in FIG. 1 can be used with the method described previously, but could also be used with other methods. For instance, using the pattern combinations depicted at FIG. 14 and FIG. 16, it is possible to use a method related to phase-shifting methodologies. In that case, sinusoidal light patterns are projected at an object surface and then reflected at an image sensor. At each photosite of the image sensor corresponding to a position $\{u,v\}$, the light intensity level is acquired and corresponds to the following equation:

$$O(u,v) = a(u,v) + b(u,v) * \cos[\theta(u,v)]$$

where:
O(u,v) Light intensity level at a particular position $\{u,v,\}$ in the reflected image recorded by the image sensing unit for the object surface
a(u, v) Mean of the sinusoidal pattern corresponding to the position $\{u,v\}$
b(u,v) Amplitude of sinusoidal pattern corresponding to the position $\{u,v\}$
θ(u,v) Phase of sinusoidal pattern corresponding to the position $\{u,v\}$ If there is three sinusoidal patterns projected with phase difference of 120 degrees as depicted in FIG. 14, then:

$$O_1(u,v) = a(u,v) + b(u,v) * \cos[\theta(u,v)] \rightarrow \quad \text{Pattern 1}$$

$$O_2(u,v) = a(u,v) + b(u,v) * \cos[\theta(u,v) + 2\pi/3] \rightarrow \quad \text{Pattern 2}$$

$$O_3(u,v) = a(u,v) + b(u,v) * \cos[\theta(u,v) + 4\pi/3] \rightarrow \quad \text{Pattern 3}$$

This system of equation can be reduced to:

$$\theta(u,v) = \operatorname{atan}\left(\frac{\{(O_3 - O_2)\cos(t_1) + (O_1 - O_3)\cos(t_2) + (O_2 - O_1)\cos(t_3)\}}{\{\{(O_3 - O_2)\sin(t_1) + (O_1 - O_3)\sin(t_2) + (O_2 - O_1)\sin(t_3)\}\}}\right)$$

where:

$t_1 = 0$ $t_2 = 2\pi/3$ $t_3 = 4\pi/3$

Therefore, the previous equation allows evaluating the phase θ(u, v) which is directly related to the z coordinate of the object surface. However, if the three sinusoidal patterns are located in distinct wavelength bands, as depicted in FIG. 14, the previous method will not work if the object surface reflectivity varies depending on light wavelength. This reflectivity variation can be mitigated by using the constant pattern as depicted in FIG. 16. In that case, for each wavelength band, the two patterns that can be represented as the following equations:

$$O_S(u,v) = \rho(u,v) * C_S(u,v,z) \rightarrow \quad \text{Sinusoidal pattern}$$

$$O_C(u,v) = \rho(u,v) * C_C(u,v,z) \rightarrow \quad \text{Constant pattern}$$

For each wavelength band, if $O_S(u, v)$ is divided by $O_C(u, v)$, then:

$$\frac{O_s(u, v)}{O_c(u, v)} = \frac{C_s(u, v, z)}{C_c(u, v, z)}$$

The term $$\frac{O_s(u, v)}{O_c(u, v)},$$

which is not dependent upon the object surface reflectivity ρ(u, v), is still sinusoidal resulting from a sinusoidal pattern divided by a constant pattern.

It is possible to translate θ(u, v) into z(u, v) with a proper calibrated model of the system.

The first presented method using correlation is preferred because it gives very accurate results and is particularly resistant to noise. Moreover, it allows using a wide variety of patterns, sinusoidal or not, if the linear independency is kept when considering the chosen pattern combination. The second presented method may be faster in processing time but may give results which are less accurate depending on the chosen calibration model.

As demonstrated previously, many methods can be used with the device 10.

It should be noted that if desired, the data processing unit 18 of the device 10 shown in FIG. 1 can process data using a graphical processing unit (GPU) or a multi-core processor for improved performance. Since the large quantity of images acquired during the calibration data acquisition can take a large amount of memory, it is possible to substantially compress the data by downsampling these images in the axis corresponding to the second image axis.

The ambient lighting can decrease the 3D measurement quality in some circumstances. In order to increase immunity to ambient lighting, an object data can be acquired while there is no projected image. The resulting data will correspond to the contribution of ambient lighting and can be subtracted from the other acquired images containing the light intensity patterns so as to mitigate the effect of the ambient lighting.

If desired, the precision and accuracy of the device 10 can be verified periodically by measuring an object surface 12 with known 3D dimensions. This reference object surface can be measured at many locations in the field of view and over the measuring range. Some scaling factors can be calculated and applied to compensate possible inaccuracies resulting from the device aging, if applicable. If these compensations are not sufficient in order to obtain accurate measurements, then a complete re-calibration of the device 10 can be performed.

Figure 32:
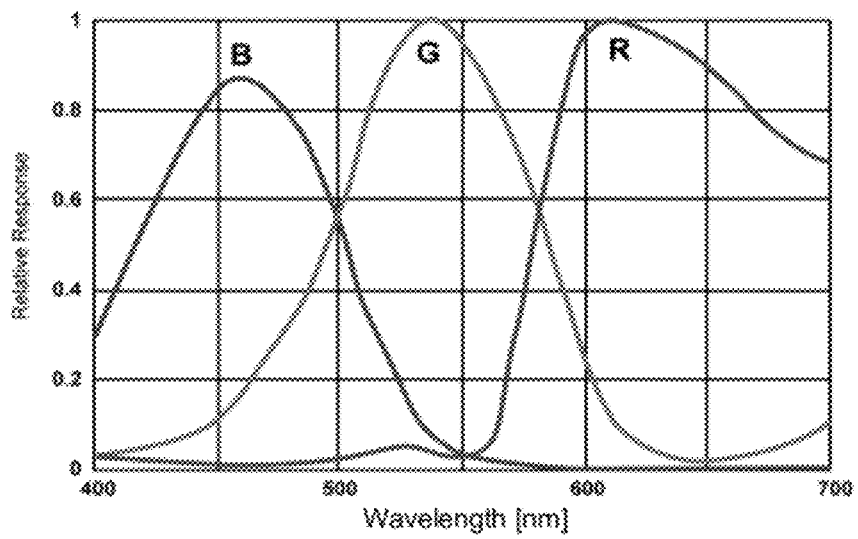
FIG. 32 is graph illustrating an example of multiplexed light intensity patterns having a relatively high crosstalk.

Color transparency slides, as spatial light modulators, can modulate light independently for multiple wavelength bands simultaneously, which is very convenient in order to keep the device as small as possible. Unfortunately, transparency slides may exhibit strong color crosstalk, which means that the wavelength bands will overlap as the example shown in FIG. 32. FIG. 32 is graph illustrating an unsuitable example of multiplexed light intensity patterns having a relatively high crosstalk. This means that light with wavelength in the overlap region, will be modulated by two patterns at the same time. This phenomenon may add errors to results especially when the object surface exhibit reflectivity variation depending on the wavelength.

Figure 33:
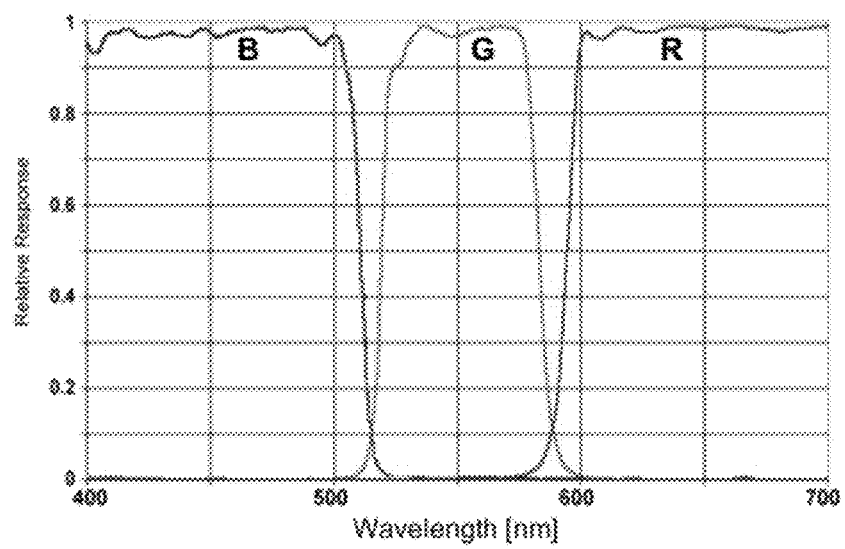
FIG. 33 is graph illustrating an example of multiplexed light intensity patterns having a relatively low crosstalk.

Patterned dichroic filters are spatial light modulators which allow modulating multiple wavelength bands simultaneously. If correctly designed, that type of spatial light modulator will not exhibit significant crosstalk between the wavelength bands, as in the example shown in FIG. 33. FIG. 33 is graph illustrating a suitable example of multiplexed light intensity patterns having a relatively low crosstalk. Then these spatial light modulators may modulate two or more wavelength bands at the same time, which is very convenient. An example of a process in order to produce that type of patterned filter is disclosed in the U.S. Pat. No. 7,648,808 issued 19 Jan. 2010 to Buchsbaum et al., which is hereby incorporated by reference.

Figure 19A:
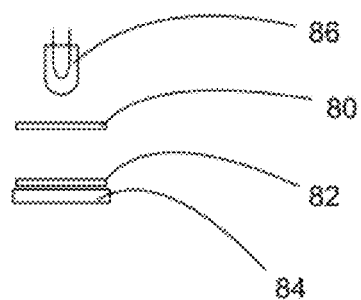
FIG. 19A is a semi-schematic view illustrating another example of a light source with a light intensity homogenizer for the device shown in FIG. 1.
Figure 19B:
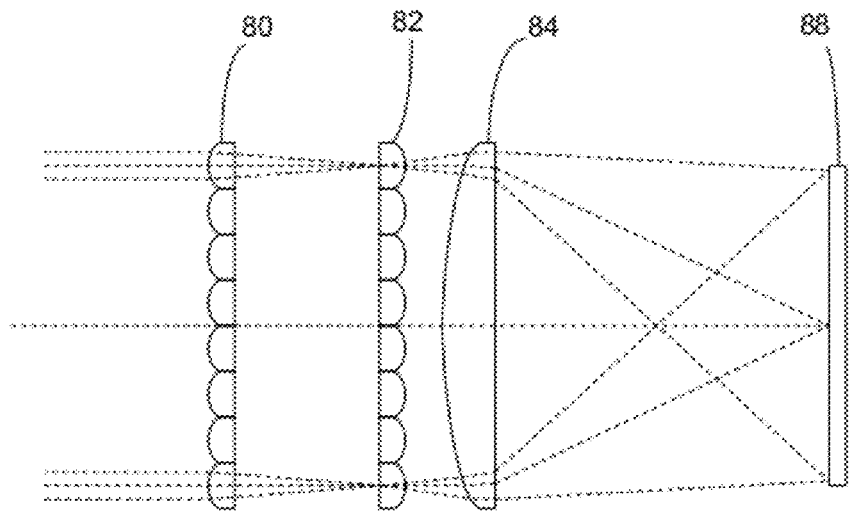
FIG. 19B is a ray diagram of the arrangement shown in FIG. 19A.

For shorter exposure time, a high intensity flash lamp can be used as light sources. A flash lamp, is an electric glow discharge lamp designed to produce extremely intense, incoherent, full-spectrum white light for very short durations. Flash lamps can be made of a length of glass tubing with electrodes at either end and are filled with a gas (for instance Xenon or others) that, when triggered, ionizes and conducts a high voltage pulse to produce the light. This type of lamp may exhibit some instability that can affect result accuracy. However, the spatial instability can be mitigated with a light intensity homogenizer. For instance, the beam of light from the high intensity flash lamp can be directed through one or many integrator lens array or a diffusing material. After that, reflectors around the light source can also help. FIG. 19A is a semi-schematic view illustrating another example of a light source with a light intensity homogenizer for the device 10 shown in FIG. 1. FIG. 19B is a ray diagram of the arrangement shown in FIG. 19A. The arrangement includes two rectangular integrator lens arrays 80, 82 and a lens 84 projecting the light from the light source 86 to a spatial light modulators 88 (FIG. 19B) in a uniformized rectangular light beam. Global energy instability may be mitigated with a normalization algorithm. The normalization algorithm includes the following steps that are to be done for each light intensity pattern: find the mean intensity of a predefined group of pixels, and then divide the light intensity pattern by the previously found mean intensity.

An example of a flash lamp is a short arc flash lamp (such as the 1100 series from Perkin Elmer) or a tubular flash lamp also called a flash tube. Such light sources are capable of generating a light flash of at least 2 mJ of illumination energy in less than 500 µs. This was found to be very interesting for "freezing" a moving object while still being able to obtain very precise measurements. In that case, all images should be projected in the shortest possible time frame, for instance within less than 1000 µs in order to have the best accuracy. There should be a maximum displacement corresponding to about half of the dimension of a precision unit (i.e. the object surface dimension divided by the number of photosites) between the start time of the first projected image and the end time of the last projected image when the object 12 and the device 10 are moving relative to one another.

If desired, more than one image sensor can be provided in a single image sensing unit 16 for a faster image acquisition sequence. This alleviates the need of delaying the image acquisition pending the complete transfer of the data from the image sensing unit 16 to the data processing unit 18 of the device 10. With two or more image sensors, object data can be acquired with one image sensor while other data images are being transferred. Also, by using multiple image sensors, multiple images can be transferred in parallel to the data processing unit 18. Each image sensor may have its own lens and be positioned in order to aim at the object surface 12. Another possible configuration is to have multiple image sensors sharing a same lens by using a multi-channel prism or beam splitters. Still, other configurations and arrangements are possible as well.

Figure 20:
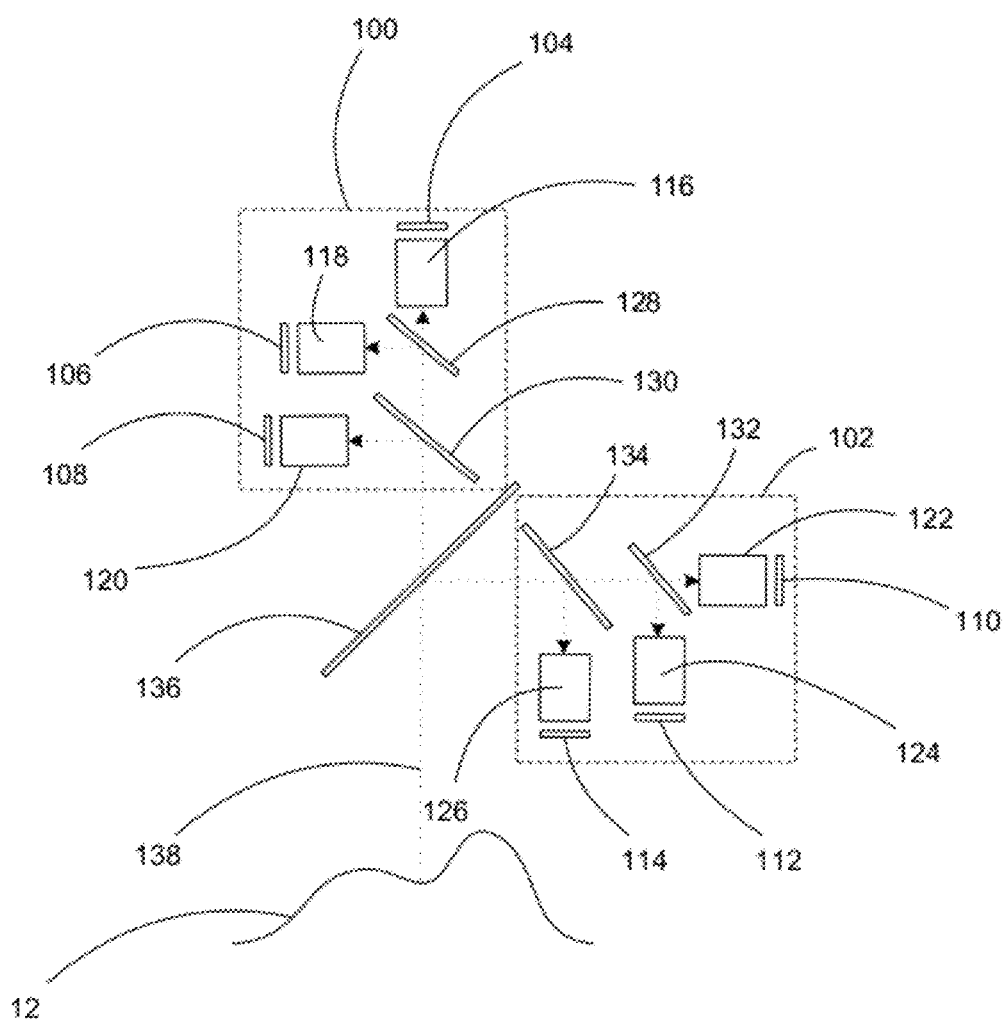
FIGS. 20 and 21 are semi-schematic views illustrating other examples of image sensing units for the device shown in FIG. 1.

A possible light sensor configuration is shown in FIG. 20. FIG. 20 is a semi-schematic view illustrating an example of image sensing unit 16 for the device 10 shown in FIG. 1. It includes two groups 100, 102 of three sensors 104, 106, 108, 110, 112, 114, each sensor having its own lens 116, 118, 120, 122, 124, 126. Each group 100, 102 includes two dichroic beam splitters 128, 130, 132, 134, allowing separating light into three specific wavelength bands, where each wavelength band will be directed at a single image sensor. The two groups 100, 102 have their optical axis merged by another neutral beam splitter 136 so that all six sensors 104, 106, 108, 110, 112, 114 have approximately the same optical axis 138 with respect to the surface 12 to inspect.

Another possible light sensor configuration is shown in FIG. 21 which again includes two groups 200, 202 of three light sensors. This time, there is one lens 204, 206 per group and the light is split into three wavelength bands using a corresponding dichroic prism 208, 210, where each wavelength band will be directed at a single image sensor. Then, the two groups 200, 202 have their optical axis merged by a neutral beam splitter 212 so that all six sensors have approximately the same optical axis with respect to the surface to inspect.

Figure 21:
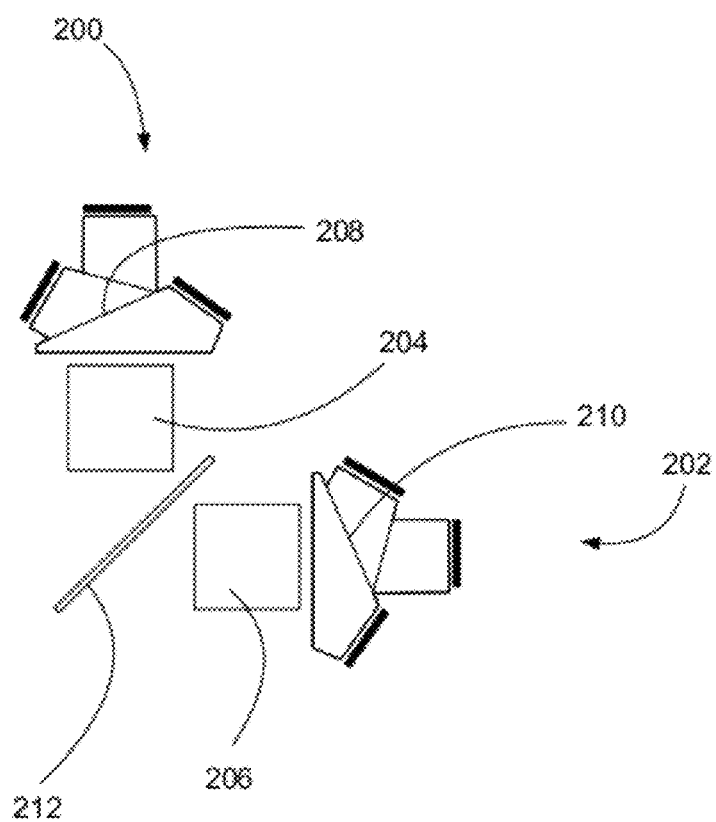

The image sensor configurations in FIGS. 20 and 21 allow very fast image acquisition. These configurations allow mitigating wavelength band crosstalk by using custom dichroic coating. Other multi-sensor configurations are possible as well.

In order to obtain best results over surfaces that exhibit some specular reflectivity, the first and second optical axis should approximately coincide for all patterns projection within a wavelength band.

If multiple image sensors are used with their optical axis not perfectly aligned, meaning that the $\{u,v,z\}$ referential is not common for all image sensors, it is still possible to use the method with the following alteration. Instead of performing the algorithm in the $\{u,v,z\}$ referential, it is possible to perform the method in the $\{x,y,z\}$ referential which can be known and in that case must be common for all image sensors. Acquired images from the image sensors are represented by pixels that are natively expressed in a $\{u,v\}$ referential. Light intensity levels may be read at a corresponding position $\{x,y\}$ in the reflected images where the location $\{u,v\}$ would be when assuming the possible value of the z-axis coordinate. In that case, object data resampling may be done at each required {x,y,z} position when performing the method.

Some camera with a double-shutter mode can be used in order to capture two images with a very short interframe time. Those cameras can transfer an image from the image sensor to a buffer very quickly and allow the acquisition of a second image within a few microseconds. The same sensor being used to capture both reflected images implies a perfect registration of the pixels. However, depending on the image sensor design, the second exposure may have to be long enough for the first buffered image to be readout entirely. In that case, the second image exposure time is typically a few dozens of milliseconds, allowing ambient light to show in the image which may affect result quality. A liquid crystal shutter in the optical path of the camera may be used to reduce the exposure time of the second image.

A light sensor with a Bayer pattern may be used in order to acquire all wavelength bands on the same sensor, which will allow having a much simpler image sensor configuration. However, standard Bayer image sensor will exhibit wavelength band crosstalk which means that a single photosite will sense mostly the corresponding wavelength band, but may also sense the neighbor wavelength band. This phenomenon will add errors to results especially when the object surface exhibit reflectivity variation depending on light wavelength. FIG. 34 is a semi-schematic view illustrating an example of a standard Bayer filter configuration.

Figure 35:
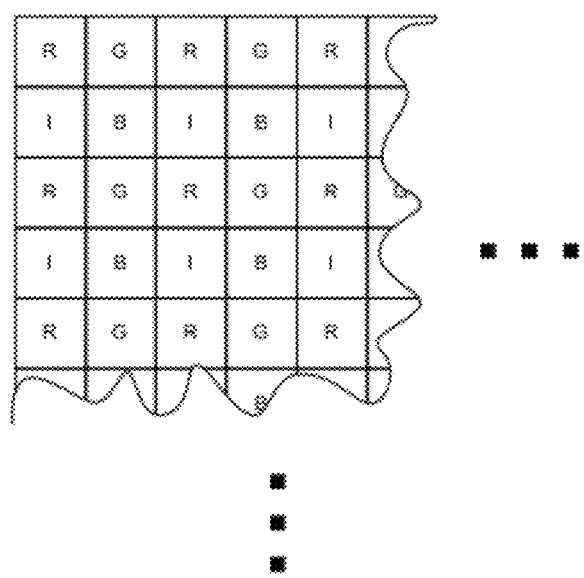
FIG. 35 is a semi-schematic view illustrating an example of a custom dichroic filter grid configuration over an image sensor.

Image sensor combined with a patterned dichroic filter which allows having a specific dichroic filter element at each photosite, will allows sensing many distinct wavelength bands with the same sensor. If properly designed, the image sensor with that type of filter element will not exhibit significant wavelength band crosstalk. An example of a custom dichroic filter grid configuration over an image sensor is shown semi-schematically in FIG. 35 which in that case would be sensitive to four distinct wavelength bands corresponding to red, blue, green and infrared. An example of a process in order to produce that type of patterned dichroic filter combined with an image sensor is disclosed in the U.S. Pat. No. 5,246,803 issued 21 Sep. 1993 to Hanrahan et al., which patent is hereby incorporated by reference.

When using an image sensor that can sense multiple wavelength bands, at each photosite, there is only one wavelength band being sensed. In order to perform the method, the intensity of all wavelength bands at each position {u,v} is needed, which can be satisfied by using intensity interpolation from the neighbor photosites corresponding to the other wavelength bands. Nearest neighbor interpolation is appropriate in most cases.

The wavelength band crosstalk can originate at the projection unit, at the image sensor unit, but also if the projected wavelength bands do not correspond closely to the sensed wavelength bands. It is possible to measure the crosstalk between two wavelength bands with the following procedure that needs to be done for each wavelength band. First, by using a spatial light modulator configured and disposed to transmit only a single wavelength band. Then, by projecting an image from that spatial light modulator and by acquiring an image at each image sensor. Finally, by computing the mean intensity for each captured image and by computing the crosstalk percentage. For instance, assuming the device has three wavelength bands corresponding to A, B and C, with a spatial light modulator configured as to projected only the A wavelength band. In that case, the image sensor corresponding to the A wavelength band should have a large mean intensity and if there is crosstalk, the image sensor corresponding to the B and C wavelength bands will have a not null mean intensity. In that case, the crosstalk between the A and B wavelength bands can be expressed as a percentage corresponding to the mean intensity in the B wavelength band divided by the mean intensity in the A wavelength band. In the same way, it is possible to find the crosstalk percentage corresponding to each possible pair of wavelength bands. Wavelength band crosstalk should be kept to a minimum in order to have the best results over surfaces having reflectivity variations that depend on light wavelength. It was found by the inventors at a crosstalk of 20% or less is an adequate margin.

Figure 22:
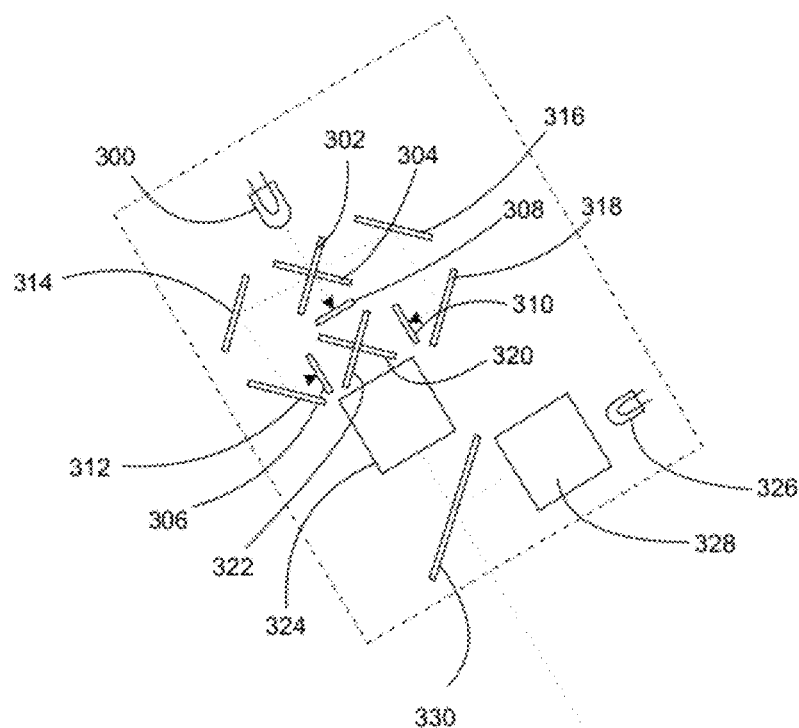
Figure 22:
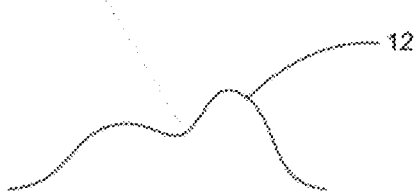

Another example of a light projection unit is depicted in FIG. 22. The light source 300 produce broadband light which is separated by dichroic beam splitters 302, 304 into three distinct wavelength bands which will be directed to spatial light modulators 306, 308, 310 using mirrors 312, 314, 316, 318. The light passing through the spatial light modulators 306, 308, 310 will be merged by two other crossing dichroic beam splitters 320, 322 and be directed to a projection lens 324. The spatial light modulators 306, 308, 310 must be effective at modulating light for the specific wavelength band they receive. This will allow forming a light intensity pattern containing three wavelength bands. Another light source 326 will be directed at a projection lens 328 which will produce a constant pattern containing the previously stated wavelength bands. The optical paths from the two projection lens 324, 328 will then be merged with by a neutral beam splitter 330. Therefore, for that example, it is possible to project a sequence of light intensity patterns by sequentially activating the two light sources 300, 326 in order to produce a light intensity pattern combination as in FIGS. 17 and 18 for instance.

Figure 23:
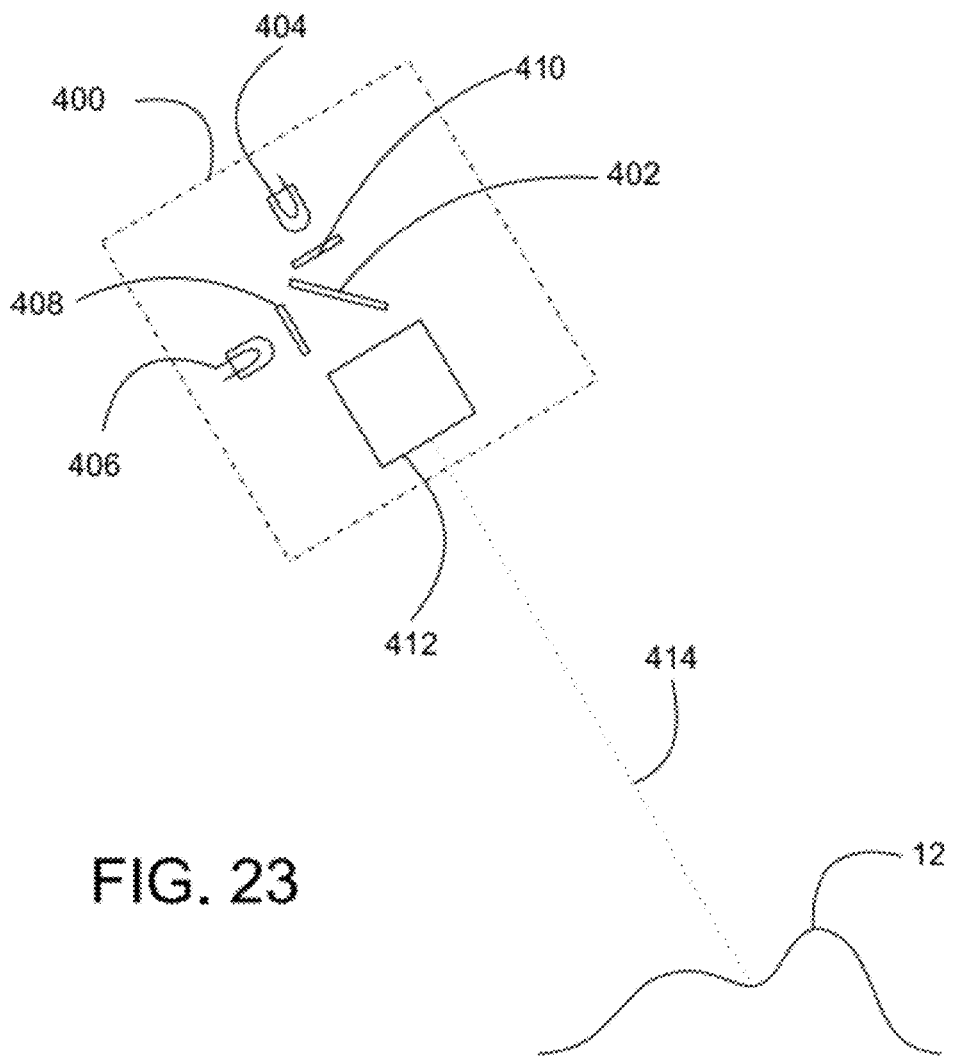

FIG. 23 is a semi-schematic view illustrating another example of a projection unit for use in a device, such as device 10 shown in FIG. 1. In this example, the project unit is identified using reference numeral 400. This projection unit 400 is almost the same as the projection unit 14 in FIG. 1 but has only one beam splitter 402, two light sources 404, 406 and two spatial light modulators 408, 410, and allows projecting only two distinct images through a lens 412 along a first optical axis 414. The spatial light modulators in this example may modulate one or more wavelength band at a time. Therefore, for that example, it is possible to project a sequence of light intensity patterns by sequentially activating the two light sources 404, 406 in order to produce a light intensity pattern combination as in FIGS. 17 and 18 for instance.

Figure 24:
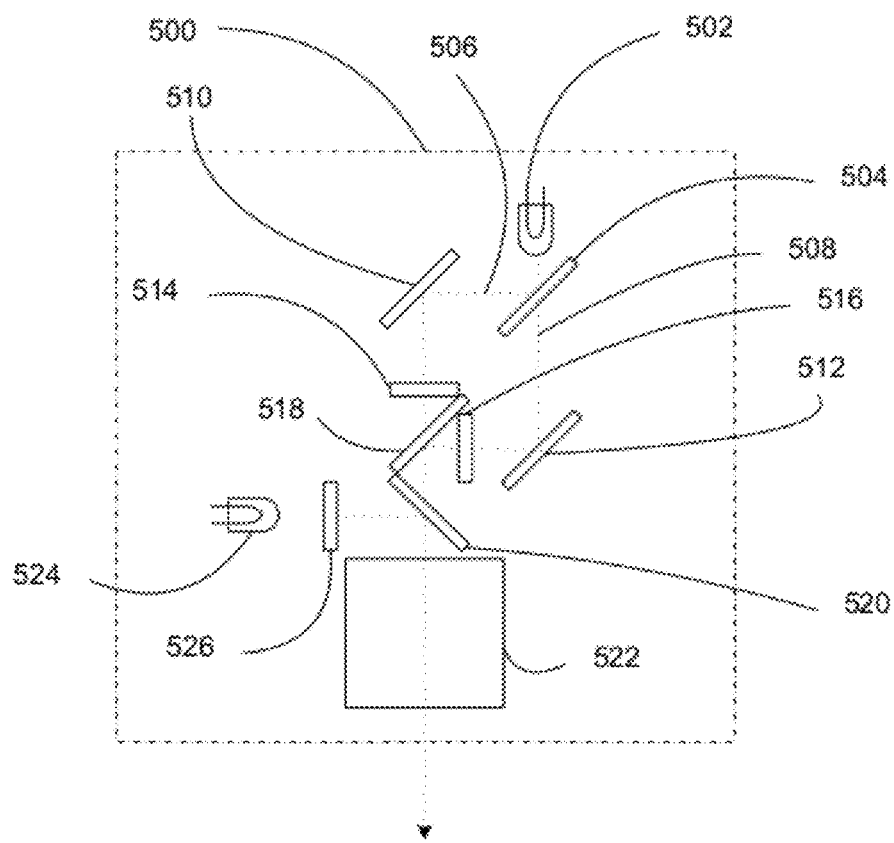

FIG. 24 is a semi-schematic view illustrating another example of a projection unit for use in a device, such as device 10 shown in FIG. 1. In this example, the project unit is identified using reference numeral 500. This projection unit 500 includes a first light source 502 emitting light toward a dichroic beam splitter 504 which separates the light into two beams 506, 508 with complementary spectrum. Then, these light beams 506, 508 are reflected by two mirrors 510, 512 at two spatial light modulators 514, 516 that may each modulate light for one or more wavelength bands. The two modulated light beams are merged with one another at a dichroic filter 518 and then pass through a neutral beam splitter 520 and finally be projected with the projection lens 522. A second light source 524 emits light at a third spatial light modulator 526. The modulated light beam hits the neutral beam splitter 520 and is partially transmitted by the projection lens 522. Therefore, for that example, it is possible to project a sequence of light intensity patterns by sequentially activating the two light sources 502, 524 in order to produce a pattern combination as in FIGS. 17 and 18 for instance.

FIG. 25 is a semi-schematic view illustrating another example of a projection unit. In this example, the projection unit is identified using reference numeral 600. The projection unit 600 can focus light from up to four light sources along a first optical axis 602. This is possible by using two similar optical subunits. One of these optical subunits contains two light sources 604, 606, two spatial light modulators 608, 610, a beam splitter 612 and a lens 614. An additional beam splitter 616 is placed in order to partially transmit light from one optical subunit along the first optical axis 602, and to partially reflect light from the other optical subunit along the first optical axis 602. Therefore, for that example, it is possible to project a sequence of light intensity patterns by sequentially activating the various light sources.

Figure 26:
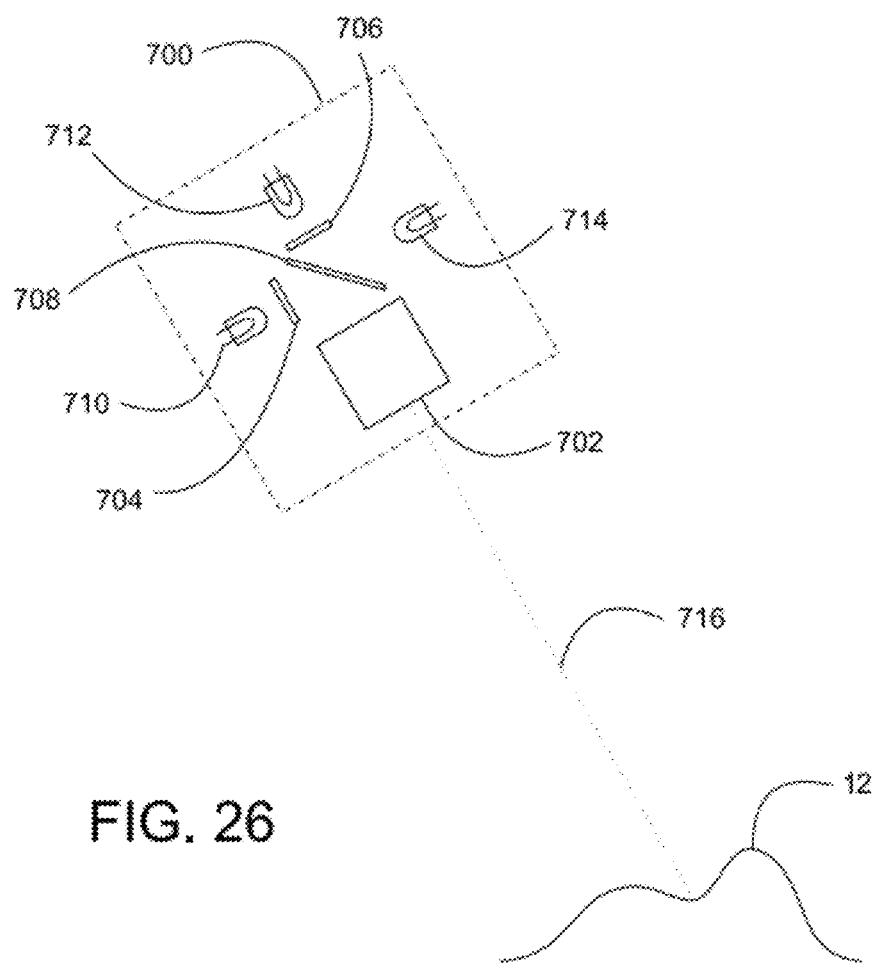

FIG. 26 is a semi-schematic view illustrating another example of a projection unit. In this example, the projection unit is identified using reference numeral 700. The projection unit 700 can project light intensity patterns through a single lens 702 by using two spatial modulators 704, 706 having reflective properties and by using a beam splitter 708. The lens 702 focuses the light from the two spatial light modulators 704, 706 on the object surface 12 using the beam splitter 708 and two light sources 710, 712. If the spatial light modulators 704, 706 have light reflective properties, as opposed to light absorption properties, then another distinct light intensity pattern can be generated by activating a third light source 714 at the same time than the two other light sources 710 and 712. The illumination from the third light source 714 is partially transmitted to one spatial light modulator 704, and partially reflected to the other spatial light modulator 706. This illumination is reflected back to the lens 702 and is projected over the object surface 12 which will add up to the transmitted patterns from light source 710 and 712. Therefore, for that example, it is possible to project a sequence of distinct light intensity patterns along the first optical axis 716 by activating sequentially the light sources 710, 712 and finally activating at the same time the three light sources, 710, 712 and 714.

Figure 27:
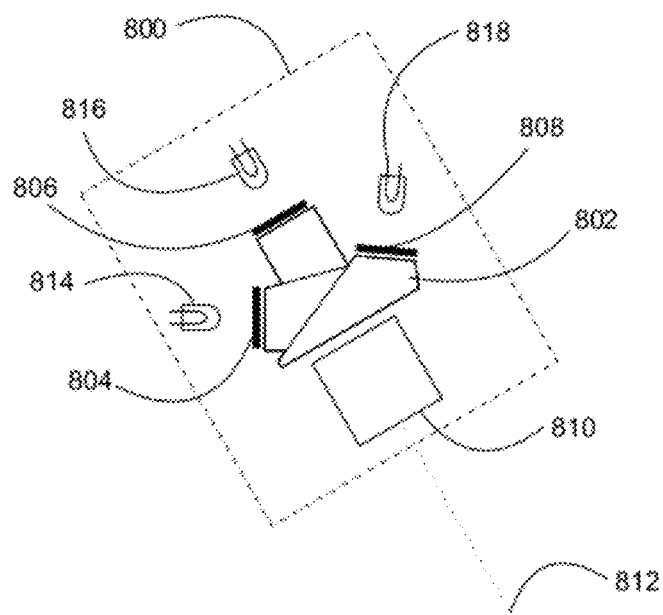

FIG. 27 is a semi-schematic view illustrating another example of a projection unit. In this example, the projection unit is identified using reference numeral 800. The projection unit 800 includes a three-channel prism 802 to focus light from three spatial light modulators 804, 806, 808 with a single lens 810. Therefore, it is possible to project a sequence of distinct light intensity patterns along a first optical axis 812 over an object surface 12 by activating sequentially one of three light sources 814, 816, 818.

Figure 28:
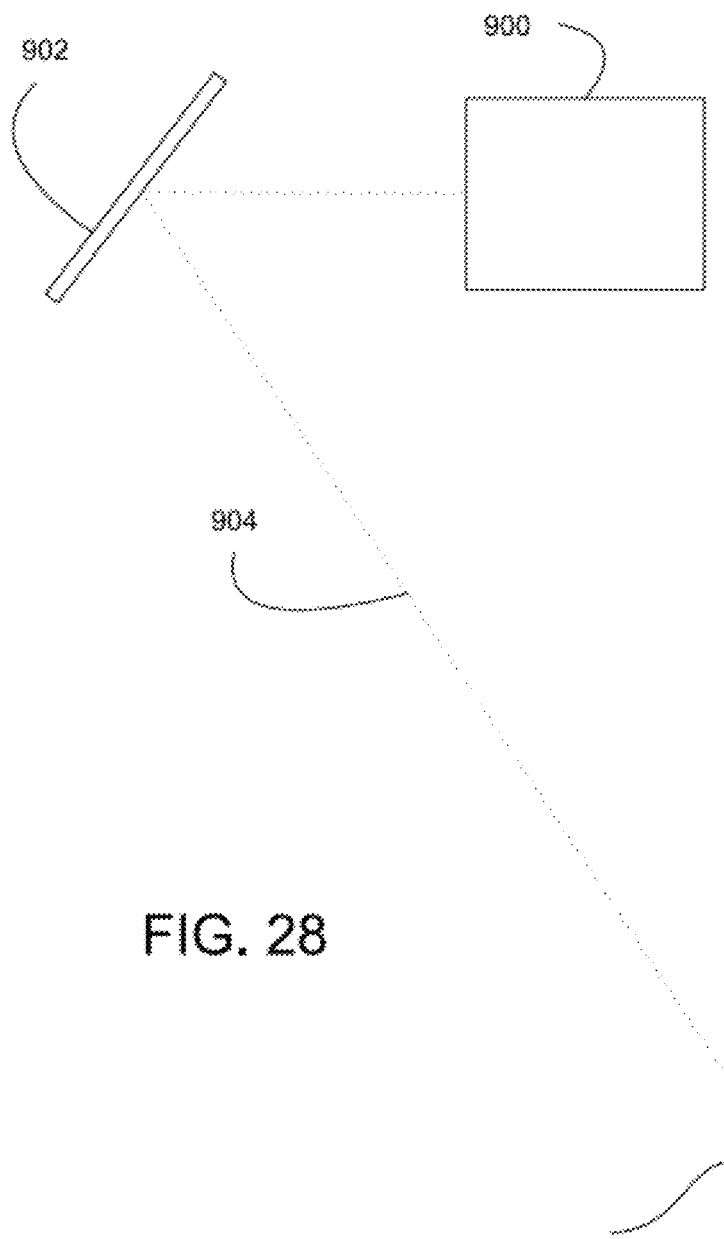
FIGS. 28 to 31 are semi-schematic views illustrating examples of alternate device configurations that can be used to implement the proposed concept.

FIG. 28 is a semi-schematic view illustrating another example of a projection unit. In this example, the projection unit is identified using reference numeral 900. The projection unit 900 includes a mirror 902 is used to increase the length along the first optical axis 904. This can also reduce the overall size of the device, for instance the device 10 shown in FIG. 1.

Figure 29:
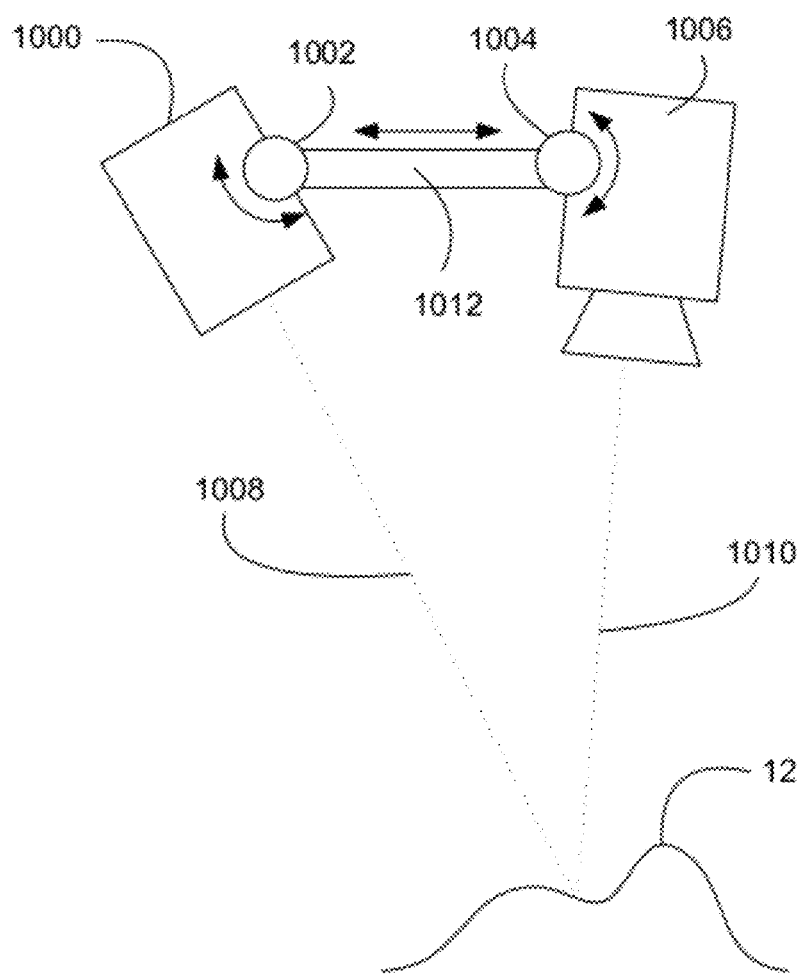

FIG. 29 is a semi-schematic view illustrating another example of an alternative configuration of the device in which the proposed concept can be implemented. In this example, the device includes a projection unit 1000. The device also includes two motorized pivoting units 1002, 1004 added for more increasing flexibility. The first motorized pivot unit 1002 supports the projection unit 1000 and the second motorized pivoting unit 1004 supports an image sensing unit 1006 in order to change the angle between the first optical axis 1008 and the second optical axis 1010. A mechanical linear actuator 1012 is also provided in this example to change the relative distance between the projection unit 1000 and the image sensing unit 1006. In order for the system to work, the first optical axis 1008 crosses the second optical axis 1010 approximately at their respective working distance. If the working distance along either one of the optical axes 1008, 1010 is modified, the angle of at least one of the optical axes 1008, 1010 must be modified and/or the distance between the projection unit 1000 and the image sensing unit 1006 must be modified in order to make the optical axes 1008, 1010 cross again approximately at their respective working distance. If desired, the motorized pivot units 1002, 1004 and the mechanical linear actuator 1012 can be automatically adjusted by the control unit (not shown in FIG. 29).

Figure 30:
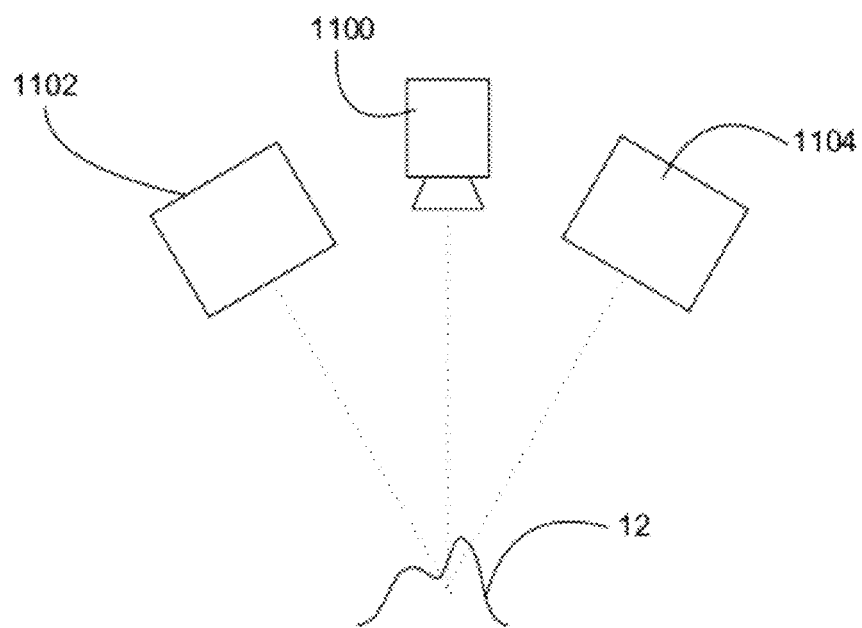
Figure 31:
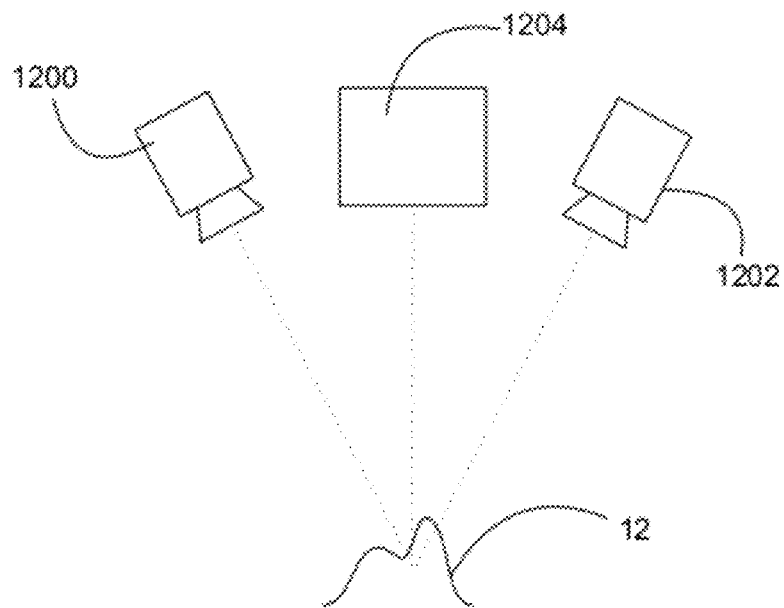

FIGS. 30 and 31 are semi-schematic views illustrating other examples of alternative configurations of the device in which the proposed concept can be implemented. These configurations can be useful for mitigating light occlusion or shadowing that can be caused by an abrupt variation of the object surface 12 preventing the light intensity patterns from reaching some areas on the object surface 12. Light occlusion can also occur if some areas of the object surface 12 prevent the reflected light from reaching the image sensing unit 1100. One way to minimize the effect of light occlusion or shadowing is by using two or more projection units 1102, 1104 positioned at different angles with respect to the object surface 12, as shown in FIG. 30. The projection units 1102, 1104 are operated in sequence.

In the example shown in FIG. 31, light occlusions are mitigated by using two or more image sensing units 1200, 1202 positioned at different angles with respect to the object surface 12. Only one projection unit 1204 is used in FIG. 30. Still, it is also possible to use multiple projection units and multiple image sensing units in a same device for mitigating light occlusion or shadowing but also in order to project and acquire more distinct patterns.

Overall, the proposed concept can find its usefulness in a very wide range of applications. For instance, it can be used in automated visual inspections in industrial fields like aeronautic, automobile, food processing, cosmetics, and many others. Another possible application is in the medical field, for instance 3D images of feet or amputated members for the production of very precise ortheses or prostheses. Still, possible uses also include the field of security, using for instance 3D images of head or hands in biometric identification. There are many other possible applications.

As can be appreciated, the proposed concept provided a very good immunity to the object surface reflectivity variation that may depend on the wavelength band. It also provides excellent accuracy over an extended measuring range. After that, the presented device allows acquiring all the required information in less than 1000 µs allowing obtaining accurate 3D data of a surface of a moving object.

The present detailed description and the appended figures are meant to be exemplary only, and a skilled person will recognize that variants can be made in light of a review of the present disclosure without departing from the proposed concept.

What is claimed is:

1. A method of obtaining 3D surface data about a surface of an object, the method including:

projecting at the object surface, along approximately a first optical axis, at least two two-dimensional (2D) images containing together at least two wavelength bands, each projected image including a first image axis and a second image axis, each of the at least two wavelength bands varying in intensity along the first image axis within at least one of the projected images, each of the at least two wavelength bands being projected at least twice;

upon projecting each image on the object surface, generating a reflected image along approximately a second optical axis, the projected images being oriented so that the first image axis is not orthogonal to a plane defined by the first and the second optical axis;

recording the reflected images to obtain sets of object data, each set being indicative of light intensity levels corresponding to a wavelength band within the reflected images; and comparing data from the sets of object data with data from sets of pre-recorded calibration data so as to obtain z-axis coordinates of a plurality of locations on the object surface, the sets of calibration data being obtained by projecting the images at a calibration reference surface for a plurality of known positions along the z-axis, the step of comparing including, for each location on the object surface:

assigning to the respective location a plurality of possible values of the z-axis coordinate for the respective location;

for each of the possible values of the z-axis coordinate for the respective location, making a comparison between:

the sets of object data, the light intensity levels being read at a position in the reflected images where the respective location would be when assuming the respective possible value of the z-axis coordinate for that respective location; and corresponding data from the sets of calibration data; and determining which one of the assigned values of the z-axis coordinates yields a best possible match between the sets of object data and the corresponding sets of calibration data, thereby finding a best z-axis coordinate for the respective location.

2. The method as defined in claim 1, wherein each image is projected for less than 500 μs.

3. The method as defined in claim 1, wherein all images are projected within less than 1000 μs, each image being projected for less than 500 μs.

4. The method as defined in claim 1, wherein at least one of the projected images contains at least two spectrally multiplexed patterns.

5. The method as defined in claim 4, wherein all pairs of wavelength bands have a crosstalk of less than 20%.

6. The method as defined in claim 1, wherein a light intensity pattern combination is linearly independent along the first image axis.

7. The method as defined in claim 1, wherein the step of comparing data from the sets of object data with data from the sets of pre-recorded calibration data includes:

performing, for each wavelength band and for each assigned z-axis coordinate of a given location, a linear regression between the sets of object data and the corresponding sets of calibration data from which a sum of squared residues is obtained, and then adding these sums of squared residues of all wavelength bands together to form a correlation coefficient associated with the respective assigned z-axis coordinate, a best possible value of the z-axis coordinate of the given location being determined by comparing the correlation coefficients together.

8. The method as defined in claim 1, wherein the method further includes:

normalizing the sets of object data and the sets of calibration data, including, for each wavelength band from each recorded image, finding a mean value of a predefined group of pixels, and then dividing pixel values by the mean value.

9. The method as defined claim 1, wherein the 3D surface data is expressed as {x,y,z} coordinates.

* * * * *